(12) United States Patent
Kalle et al.

(10) Patent No.: US 12,299,114 B2
(45) Date of Patent: May 13, 2025

(54) SYSTEM AND METHOD FOR IMPLEMENTING TRUST BROKER FRAMEWORK IN O-RAN

(71) Applicant: RAKUTEN MOBILE, INC., Tokyo (JP)

(72) Inventors: Ritesh Kumar Kalle, Tokyo (JP); Raghavendran Ramiya, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/012,790

(22) PCT Filed: Oct. 27, 2022

(86) PCT No.: PCT/US2022/048027
§ 371 (c)(1),
(2) Date: Dec. 23, 2022

(87) PCT Pub. No.: WO2023/204844
PCT Pub. Date: Oct. 26, 2023

(65) Prior Publication Data
US 2024/0104192 A1    Mar. 28, 2024

Related U.S. Application Data

(60) Provisional application No. 63/332,341, filed on Apr. 19, 2022.

(51) Int. Cl.
*G06F 21/00* (2013.01)
*G06F 21/52* (2013.01)

(52) U.S. Cl.
CPC ........ *G06F 21/52* (2013.01); *G06F 2221/033* (2013.01)

(58) Field of Classification Search
CPC .... G06F 21/52; G06F 2221/033; G06F 21/57; H04L 9/3247; H04L 9/3268; H04L 9/0825
See application file for complete search history.

(56) References Cited

U.S. PATENT DOCUMENTS 10,447,682 B1 * 10/2019 Du Lac ................. H04L 9/3247
2014/0122873 A1 * 5/2014 Deutsch ............. H04L 63/0884
713/158

(Continued)

FOREIGN PATENT DOCUMENTS

WO    2021/034906 A1    2/2021

OTHER PUBLICATIONS

International Search Report issued Mar. 27, 2023 in Application No. PCT/US22/48027.

(Continued)

*Primary Examiner* — Ghazal B Shehni
(74) *Attorney, Agent, or Firm* — Sughrue Mion, PLLC

(57) ABSTRACT

A method, performed by at least one processor of a trust broker, for establishing trust of vendor-supplied Open Radio Access Network (O-RAN) software, includes: receiving a plurality of O-RAN software from a plurality of O-RAN software vendors, the plurality of O-RAN software respectively signed by the plurality of O-RAN software vendors; for a software, among the plurality of O-RAN software, verifying a signature included with the software using a vendor certificate issued by a certificate authority (CA) of the corresponding vendor; based on successful verification of the signature, performing a software attestation with respect to the software using a digital certificate issued by a CA of the trust broker; and providing the attested software to an operator corresponding to the O-RAN system and with which the trust broker has a trust relationship.

15 Claims, 19 Drawing Sheets

(56) References Cited

U.S. PATENT DOCUMENTS

2015/0244735 A1* 8/2015 Kumar ............... H04L 63/1425
                                                      726/23
2019/0243950 A1* 8/2019 Soriente ................ G06F 9/545
2019/0312734 A1* 10/2019 Wentz .................. H04L 9/3239

OTHER PUBLICATIONS

Written Opinion issued Mar. 27, 2023 in Application No. PCT/US22/48027.

* cited by examiner

SYSTEM AND METHOD FOR IMPLEMENTING TRUST BROKER FRAMEWORK IN O-RAN

CROSS REFERENCE TO RELATED APPLICATIONS

This application is a National Stage of International Application No. PCT/US2022/048027 filed Oct. 27, 2022, claiming priority based on U.S. Provisional Application No. 63/332,341 filed Apr. 19, 2022.

BACKGROUND

A radio access network (RAN) is an important component in a telecommunications system, as it connects end-user devices (or user equipment) to other parts of the network. The RAN includes a combination of various network elements (NEs) that connect end-users to a core network. Traditionally, hardware and/or software of a particular RAN is vendor specific.

Open RAN (O-RAN) technology has emerged to enable multiple vendors to provide hardware and/or software to a telecommunications system. O-RAN disaggregates the RAN functions into a centralized unit (CU), a distributed unit (DU), and a radio unit (RU). Further, RAN functions in the O-RAN architecture are controlled and optimized by a RAN Intelligent Controller (RIC). The RIC is a software-defined component that implements modular applications to facilitate the multivendor operability required in the O-RAN system, as well as to automate and optimize RAN operations.

FIG. 1 illustrates an O-RAN architecture in the related art. Referring to FIG. 1, the RIC is divided into two types: a non-real-time RIC (Non-RT RIC) and a near-real-time RIC (Near-RT RIC). The Non-RT RIC operates on a timescale greater than 1 second within the Service Management and Orchestration (SMO) framework. Its functionalities are implemented through modular applications called rApps, and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN Centralized Unit (O-CU), O-RAN Distributed Unit (O-DU), etc.).

The Near-RT RIC operates on a timescale between 10 milliseconds and 1 second and is coupled with the O-CU control plane (O-CU-CP) and the O-CU user plane (O-CU-UP) via the E2 interface. It hosts xApps to implement functions such as interference mitigation, load balancing, security, etc. The two types of RICs work together to optimize the O-RAN. For example, the Non-RT RIC provides the policies, data, and AI/ML models enforced and used by the Near-RT RIC for RAN optimization.

The SMO framework, within which the Non-RT RIC is located, manages and orchestrates RAN elements. Specifically, the SMO manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself.

Because O-RAN is based on a cloud native architecture and the above-described O-RAN entities have open protocols and interfaces between them (including those within the Fronthaul (Open Fronthaul) and Midhaul (Open Midhaul)), they can be developed by different vendors. That is, multiple vendors are involved in the delivery of various O-RAN software components such as the O-CU, O-DU, software within the O-RU, the Non-RT RIC rApps, the Near-RT RIC xApps, etc. As a result, software supply chain security in O-RAN is critically important.

Related art methods of software verification, however, are not suitable for verifying software trust across multiple vendors and providers. For example, there is no centralized or single source trust broker available for O-RAN or O-Cloud operators, and mobile operators do not have implicit trust with all vendors and providers or all vendor signatures. Furthermore, related art O-RAN ecosystems are not suited or configured to verify trust from a multitude of suppliers and manage multiple certificates. As a result, there is no guarantee that the software code utilized within the various O-RAN components has not been altered between build and deployment in the production, and the O-Cloud environment is accessible to an attacker via a compromised software image. Failing to verify authenticity, integrity and confidentiality of the software before deployment can have serious implications on supply chain attacks (such as a SolarWinds attacks/Log4J vulnerability, etc.) in O-RAN, as shown in FIG. 2.

SUMMARY

Aspects of one or more embodiments provide systems and methods to mitigate risks associated with software supply chain attacks.

Aspects of one or more embodiments provide systems and methods that implement a trust broker framework to verify authenticity, integrity and confidentiality of various O-RAN software components from multiple providers and establish a single source of O-RAN trust relationship with multiple consumers.

According to aspects of one or more embodiments, a method, performed by at least one processor of a trust broker, for establishing trust of vendor-supplied Open Radio Access Network (O-RAN) software, includes: receiving a plurality of O-RAN software from a plurality of O-RAN software vendors, the plurality of O-RAN software respectively signed by the plurality of O-RAN software vendors; for a software, among the plurality of O-RAN software, verifying a signature included with the software using a vendor certificate issued by a certificate authority (CA) of the corresponding vendor; based on successful verification of the signature, performing a software attestation with respect to the software using a digital certificate issued by a CA of the trust broker; and providing the attested software to an operator corresponding to the O-RAN system and with which the trust broker has a trust relationship.

The receiving the plurality of software may include receiving the software, the signature, the vendor certificate, and at least one of a Software Bill of Materials (SBOM) and a scan report corresponding to a vulnerability scan performed by the corresponding vendor.

The method may further include: verifying trust of the CA of the corresponding vendor, wherein the performing the software attestation may include performing the software attestation based on successful verification of the trust of the CA and successful verification of the signature.

The verifying the trust of the CA of the corresponding vendor may include decrypting and verifying a signature included in the vendor certificate using a key included in a pre-installed vendor CA certificate, from among a plurality of certificates previously-received from a plurality of CAs corresponding to the plurality of O-RAN software vendors.

The verifying the signature may include: decrypting the signature using a key included in the vendor certificate; applying a hash function to the software to obtain a digest; and determining whether the decrypted signature and the digest correspond to each other.

The performing the software attestation may include: submitting a certificate signing request (CSR) to the CA of the trust broker, the CSR including a public key of the trust broker; obtaining the digital certificate issued by the CA of the trust broker, based on the certificate signing request, the digital certificate including the public key of the trust broker; and generating at least one trust broker signature corresponding to the software, using a private key corresponding to the public key of the trust broker.

The generating the at least one trust broker signature may include: generating a first trust broker signature by generating and encrypting, using the private key, a signature of the software; generating a second trust broker signature by generating and encrypting, using the private key, a signature of a scan result corresponding to a vulnerability scan of the software; and generating a third trust broker signature by generating and encrypting, using the private key, an SBOM of the software.

The method may further include at least one of: performing, by the trust broker, the vulnerability scan of the software; and generating the SBOM of the software.

The providing the attested software to the O-RAN system may include: storing a bundle including the software, the at least one trust broker signature, and the digital certificate in a trust broker registry; and providing the bundle to at least one of an O-RAN operator and an O-Cloud operator corresponding to the O-RAN system for verification of the at least one trust broker signature and deployment in the O-RAN system, the at least one of the O-RAN operator and the O-Cloud operator having the trust relationship with the trust broker.

According to aspects of one or more other embodiments, a system for establishing trust of vendor-supplied Open Radio Access Network (O-RAN) software, includes: at least one memory storing instructions; and at least one processor configured to execute the instructions to: receive a plurality of O-RAN software from a plurality of O-RAN software vendors, the plurality of O-RAN software respectively signed by the plurality of O-RAN software vendors; for a software, among the plurality of O-RAN software, verify a signature included with the software using a vendor certificate issued by a certificate authority (CA) of the corresponding vendor; based on successful verification of the signature, performing a software attestation with respect to the software using a digital certificate issued by a CA of a trust broker; and provide the attested software to an operator corresponding to the O-RAN system and with which the trust broker has a trust relationship.

The at least one processor may be further configured to execute the instructions to receive the software, the signature, the vendor certificate, and at least one of a Software Bill of Materials (SBOM) and a scan report corresponding to a vulnerability scan performed by the corresponding vendor.

The at least one processor may be further configured to execute the instructions to: verify trust of the CA of the corresponding vendor; and perform the software attestation based on successful verification of the trust of the CA and successful verification of the signature.

The at least one processor may be further configured to execute the instructions to verify the trust of the CA of the corresponding vendor by decrypting and verifying a signature included in the vendor certificate using a key included in a pre-installed vendor CA certificate, from among a plurality of certificates previously-received from a plurality of CAs corresponding to the plurality of O-RAN software vendors.

The at least one processor may be further configured to execute the instructions to: decrypt the signature using a key included in the vendor certificate; apply a hash function to the software to obtain a digest; and determine whether the decrypted signature and the digest correspond to each other in order to verify the signature.

The at least one processor may be further configured to execute the instructions to perform the software attestation by: submitting a certificate signing request (CSR) to the CA of the trust broker, the CSR including a public key of the trust broker; obtaining the digital certificate issued by the CA of the trust broker, based on the certificate signing request, the digital certificate including the public key of the trust broker; and generating at least one trust broker signature corresponding to the software, using a private key corresponding to the public key of the trust broker.

The at least one processor may be further configured to execute the instructions to: generate a first trust broker signature by generating and encrypting, using the private key, a signature of the software; generate a second trust broker signature by generating and encrypting, using the private key, a signature of a scan result corresponding to a vulnerability scan of the software; and generate a third trust broker signature by generating and encrypting, using the private key, an SBOM of the software.

The at least one processor may be further configured to execute the instructions to: perform the vulnerability scan of the software; and/or generate the SBOM of the software.

The at least one processor may be further configured to execute the instructions to: store a bundle including the software, the at least one trust broker signature, and the digital certificate in a trust broker registry; and provide the bundle to at least one of an O-RAN operator and an O-Cloud operator corresponding to the O-RAN system for verification of the at least one trust broker signature and deployment in the O-RAN system, the at least one of the O-RAN operator and the O-Cloud operator having the trust relationship with the trust broker.

According to aspects of one or more other embodiments, a non-transitory computer-readable recording medium has recorded thereon instructions executable by at least one processor of a trust broker to perform a method for establishing trust of vendor-supplied Open Radio Access Network (O-RAN) software, the method including: receiving a plurality of O-RAN software from a plurality of O-RAN software vendors, the plurality of O-RAN software respectively signed by the plurality of O-RAN software vendors; for a software, among the plurality of O-RAN software, verifying a signature included with the software using a vendor certificate issued by a certificate authority (CA) of the corresponding vendor; based on successful verification of the signature, performing a software attestation with respect to the software using a digital certificate issued by a CA of the trust broker; and providing the attested software to an operator corresponding to the O-RAN system and with which the trust broker has a trust relationship.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
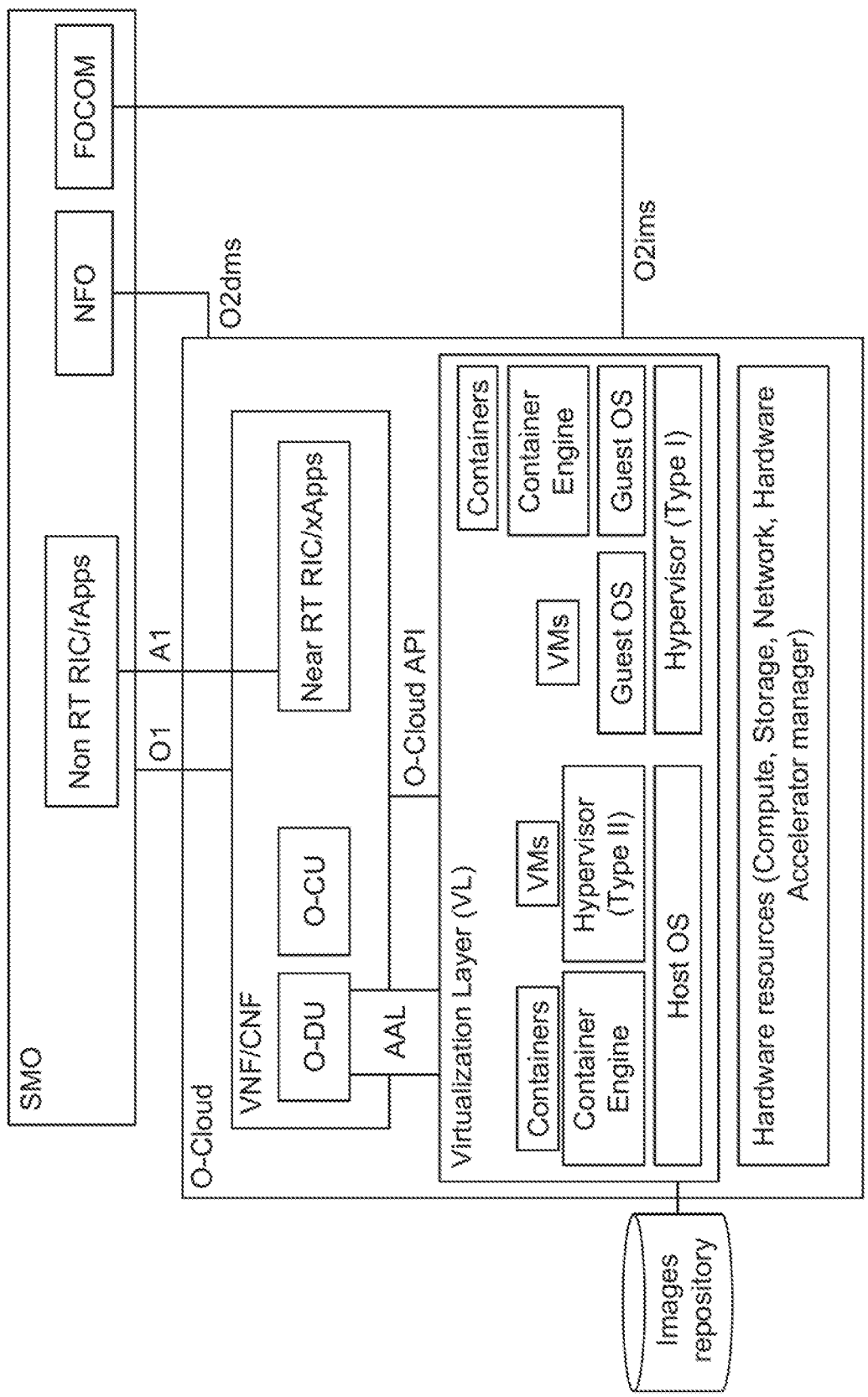
FIG. 1 illustrates an O-RAN architecture in the related art.
Figure 2:
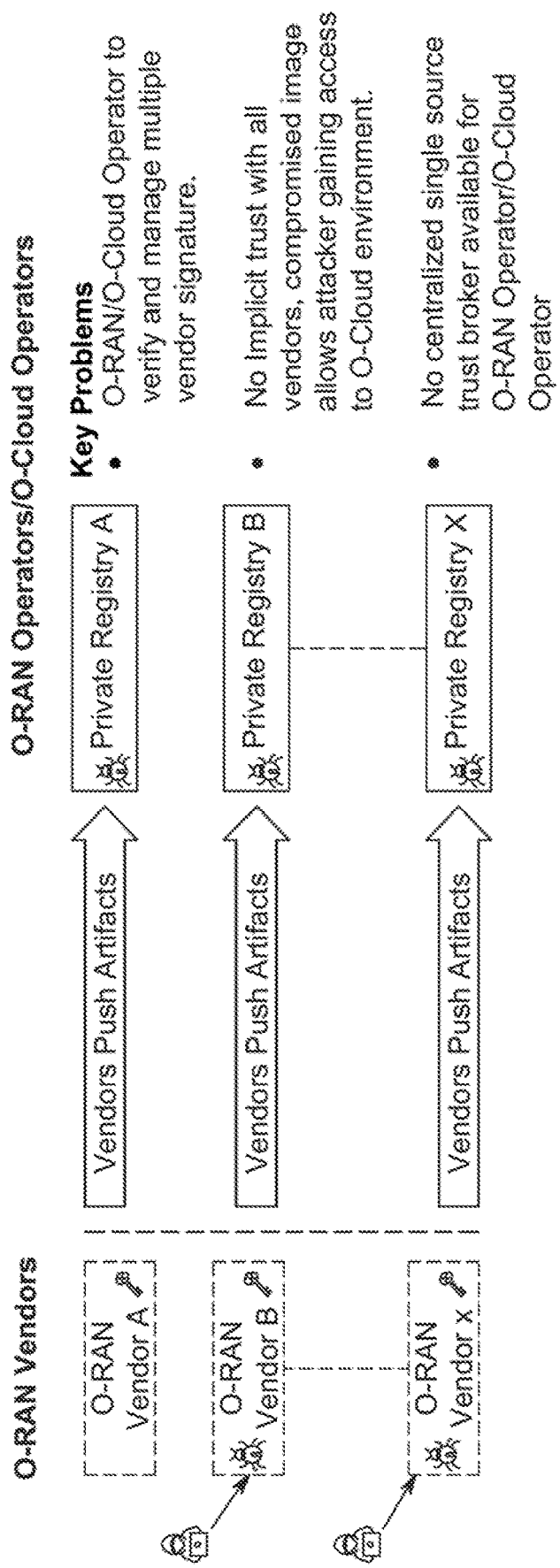
FIG. 2 illustrates a system architecture in the related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide an apparatus and method for implementing a trust broker framework to verify the authenticity, integrity, and confidentiality of O-RAN software components supplied by any of multiple vendors, and attest the O-RAN software components for secure delivery to the O-RAN system. Further, because the trust broker framework both verifies the authenticity of vendor-supplied software components and has a trust relationship with the O-RAN system (i.e., O-RAN and/or O-Cloud operators), security for O-RAN is improved, and risks of any potential supply chain attacks and associated costs are reduced.

Figure 3:
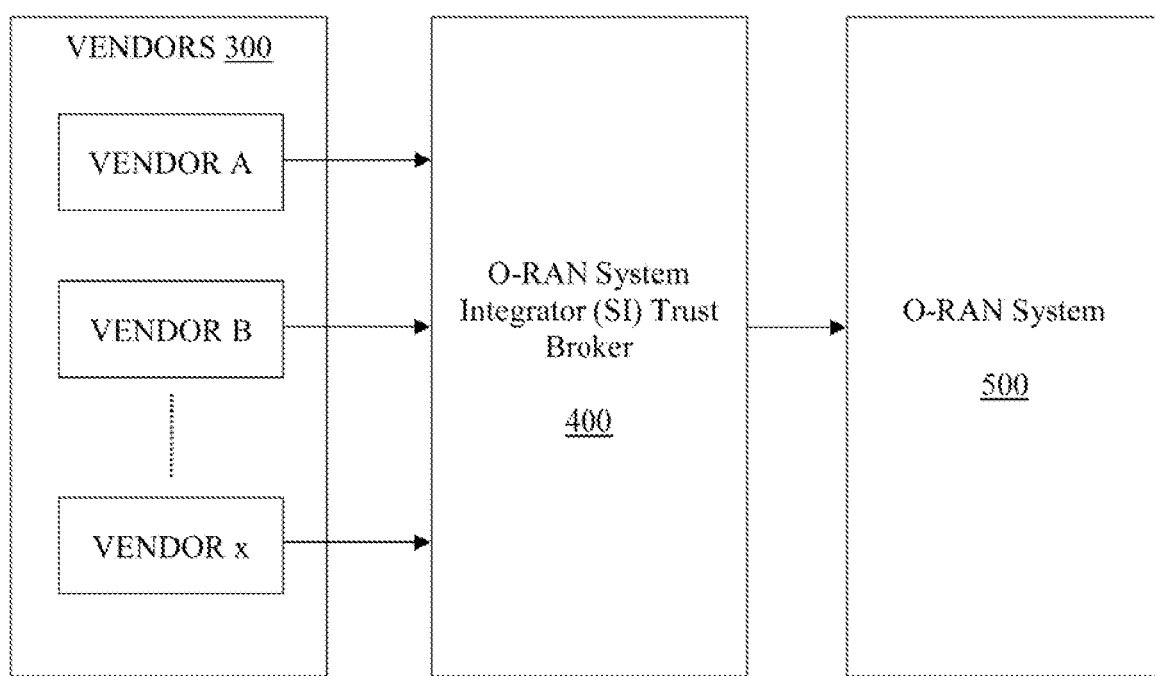
FIG. 3 illustrates a block diagram of system architecture according to one or more embodiments.

FIG. 3 illustrates a system architecture according to one or more embodiments. Referring to FIG. 3, the system includes a plurality of O-RAN vendors 300, an O-RAN System Integrator (SI) trust broker 400 according to one or more embodiments, and an O-RAN system 500.

The O-RAN SI trust broker 400 is configured to receive software or software components (artifacts) provided by the plurality of O-RAN vendors 300, verify the software, attest the software, and provide the attested software to the O-RAN system 500. The O-RAN SI trust broker 400 may be implemented as one or more computing devices (e.g., servers).

In further detail, the O-RAN SI trust broker 400 is configured to receive signed artifacts from the plurality of vendors 300. For example, upon building a software image and upon performing a successful image scan for vulnerability, a vendor signs the software image and pushes or transmits the signed image to the O-RAN SI trust broker

400. Here, the vendor may sign the software image with a private key, and may transmit the software image with a digital certificate (e.g., X.509 certificate) issued by the vendor's certificate authority (CA). The signature may correspond to a hash value (or digest) obtained by applying a predetermined hash function to the software image and encrypted using the private key. According to an embodiment, the vendor may transmit the software image together with the digital certificate and an encrypted signature (encrypted using the vendor's private key corresponding to the public key included in the digital certificate). Alternatively, the digital certificate may be separately (e.g., previously) transmitted to the O-RAN SI trust broker 400. Further, the vendor may also transmit at least one of a scan report and a Software Bill of Materials (SBOM) with the software image. The software image may correspond to an entirety or a portion of a component for the O-RAN system 500, such as the O-CU, O-DU, software within the O-RU, the Non-RT RIC rApps, the Near-RT RIC xApps, etc.

As set forth above, the O-RAN SI trust broker 400 is configured to verify the software. According to an embodiment, the O-RAN SI trust broker 400 is configured to verify or confirm that the vendor CA is trusted, i.e., verify the trust of the CA that issued the digital certificate bundled with and/or including the public key corresponding to the private key that signed the software image. For example, the O-RAN SI trust broker 400 may previously receive and/or install digital certificates issued by each of the vendors' CAs (e.g., vendor CA root certificates). In this case, the O-RAN SI trust broker 400 may use a trusted public key included in the corresponding vendor CA certificate to decrypt and verify the signature included in the digital certificate transmitted with the software image (and signed by the vendor CA using the private key corresponding to the trusted public key). If the verification fails, the O-RAN SI trust broker 400 cannot establish the trustworthiness of the digital signature included with the software image, and takes at least one predetermined action (e.g., deletes the software image, reports the source of the software image, blacklists the source of the software image, etc.).

Further, the O-RAN SI trust broker 400 is configured to verify the signature included with the software. According to an embodiment, the O-RAN SI trust broker 400 decrypts the signature using the public key in the digital certificate transmitted with the software image, and applies a predetermined hash function (i.e., the same hash function used to generate the signature) to the software image to obtain a resulting hash value or digest. Based on the decrypted signature matching the hash digest, the O-RAN SI trust broker 400 determines the verification to be successful, i.e., successfully verifies the authenticity and integrity of the software. Otherwise, the O-RAN SI trust broker 400 does not successfully verify the software and takes at least one predetermined action (e.g., deletes the software image, reports the source of the software image, blacklists the source of the software image, etc.).

Next, based on successfully verifying the software, the O-RAN SI trust broker 400 is configured to attest the verified software. According to an embodiment, the O-RAN SI trust broker 400 performs a signature attestation with respect to at least one component, i.e., at least one of the software image, the scan results, and the SBOM. The scan results and/or the SBOM may be received from the vendor with the software image, or the O-RAN SI trust broker 400 may itself obtain the scan results by performing a scan and/or may itself generate the SBOM.

The O-RAN SI trust broker 400 may perform the signature attestation by obtaining a digital certificate from its own CA (trust broker CA certificate) and signing at least one of the above-mentioned components. For example, the O-RAN SI trust broker 400 may apply a predetermined hash function to at least one of the software image, the scan results, and the SBOM, and encrypt the resulting digest using its private key corresponding to the public key included in the obtained trust broker CA digital certificate. The O-RAN SI trust broker 400 may then bundle, combine, or otherwise associate the software components, signatures, and digital certificate together, and make them available to the O-RAN system 500 (e.g., by storing in an O-RAN SI trust broker registry). Because there is a trust relationship between the O-RAN SI trust broker 400 and the O-RAN system 500 (e.g., telco operator, O-RAN operator, and/or O-Cloud operator), the software can be verified by verifying the image signature using the trust broker CA certificate before installation in the O-RAN system 500.

In at least some embodiments, the O-RAN SI trust broker 400 may provide (or otherwise make available) the attested software to a plurality of different O-RAN systems or O-Clouds operated by different O-RAN operators and/or O-Cloud operators. To this end, the attested software may be stored in a trust broker registry of the O-RAN SI trust broker 400 and may be imported from the trust broker registry to one or more private registries of one or more O-RAN operators and/or O-Cloud operators.

Figure 4:
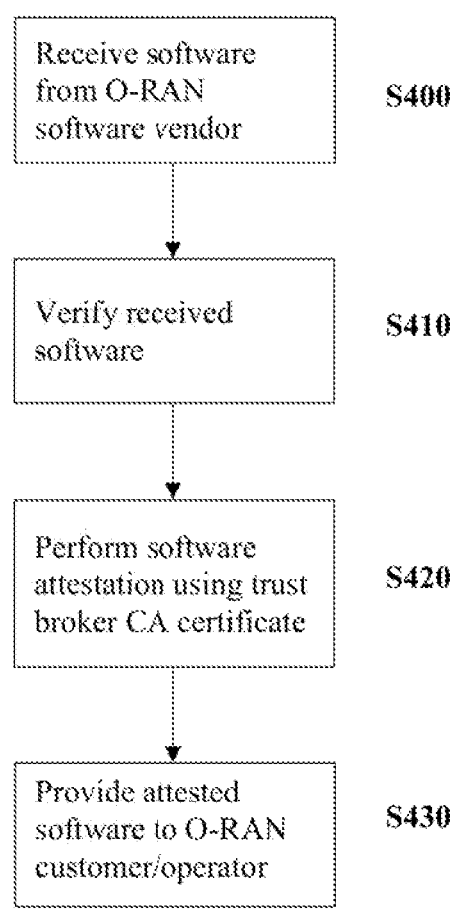
FIG. 4 is a flowchart of a method for establishing trust of vendor-supplied software, according to one or more embodiments.

FIG. 4 is a flowchart of a method for establishing trust of vendor-supplied software, according to one or more embodiments. The method of FIG. 4 may be performed by a trust broker in accordance with an embodiment, e.g., the O-RAN SI trust broker 400 illustrated in FIG. 3 (or a policy engine thereof).

Referring to FIG. 4, at operation S400, the trust broker receives software from an O-RAN software vendor, from among a plurality of O-RAN software vendors (or suppliers). Here, the trust broker may store the received software in a registry for storing unverified software received from the plurality of vendors. The received software is signed by the vendor. For example, the vendor signs the software image using its private key, and pushes or transmits the signed image to the trust broker together with a digital certificate (e.g., X.509 certificate) issued by the vendor's certificate authority (CA). The digital certificate may include the public key corresponding to the private key used to sign the software image. Further, the vendor may also transmit at least one of a scan report and a Software Bill of Materials (SBOM) with the software image. The software image may correspond to an entirety or a component an element for an O-RAN system, such as the O-CU, O-DU, software within the O-RU, the Non-RT RIC rApps, the Near-RT RIC xApps, etc.

At operation S410, the trust broker verifies the received software. In particular, the trust broker verifies the signature included with the receive software.

At operation S420, based on successful verification of the software, the trust broker performs an attestation with respect to the software, using a digital certificate issued by a CA of the trust broker. According to one or more other embodiments, the O-RAN trust broker may also scan the supplier software images for known vulnerabilities to check if there are any predetermined, critical and/or high severity vulnerabilities, before proceeding with the software attestation. In this case, if the scan determines or detects a predetermined, critical, and/or high severity vulnerability, the trust broker may not perform the software attestation and may take at least one predetermined action (e.g., delete the software image, report the source of the software image, blacklist the source of the software image, etc.).

At operation S430, the trust broker provides the attested software to the O-RAN, e.g., an O-RAN operator and/or O-Cloud operator. The attested software provided by the trust broker may be provided with a trust broker CA certificate used to attest (or sign) the software.

Figure 5:
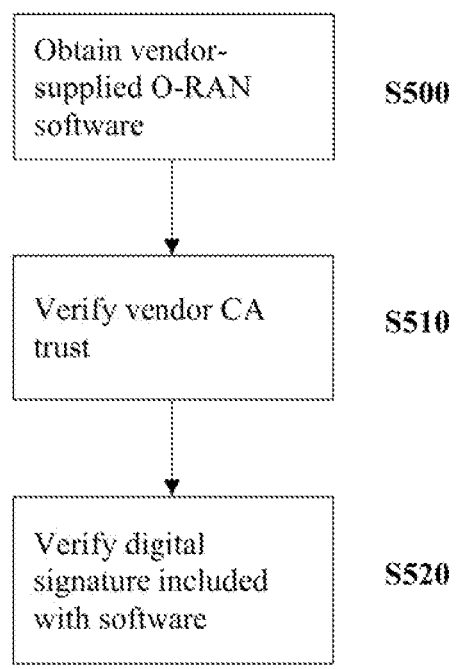
FIG. 5 illustrates a flowchart of a method for verifying software received from a vendor, according to one or more embodiments.

FIG. 5 illustrates a flowchart of a method for verifying software received from a vendor, according to one or more embodiments. The method of FIG. 5 may correspond to operation S410 in FIG. 4, and may be performed by a trust broker according to an embodiment.

Referring to FIG. 5, at operation S500, the trust broker obtains vendor-supplied O-RAN software from a storage (e.g., a registry in which vendor-supplied software is pushed by vendors). The obtained software includes a software image, a digital signature, and a vendor CA digital certificate. The obtained software may further include at least one of a scan report (e.g., based on a vulnerability scan performed by the vendor prior to signing the software image) and an SBOM.

At operation S510 the trust broker verifies the vendor CA trust. For example, the trust broker may previously receive and/or install digital certificates issued by each of the vendors' CAs (e.g., vendor CA root certificates). In this case, the trust broker may use a trusted public key included in the corresponding vendor CA certificate to decrypt and verify the signature included in the digital certificate transmitted with the software image (and signed by the vendor CA using the private key corresponding to the trusted public key). If the verification fails, the trust broker cannot establish the trustworthiness of the digital signature included with the software image, and may take at least one predetermined action (e.g., deletes the software image, reports the source of the software image, blacklists the source of the software image, etc.).

At operation S520, the trust broker verifies the digital signature included with the software. According to an embodiment, the trust broker decrypts the signature using the public key in the digital certificate transmitted with the software image, and applies a predetermined hash function (i.e., the same hash function used to generate the signature) to the software image to obtain a resulting hash value or digest. Based on the decrypted signature matching the hash digest, the trust broker determines the verification to be successful, i.e., successfully verifies the authenticity and integrity of the software. Otherwise, the trust broker does not successfully verify the software and may take at least one predetermined action (e.g., deletes the software image, reports the source of the software image, blacklists the source of the software image, etc.).

It is understood that, in various embodiments, operations S510 and S520 may occur in either order (i.e., operation S510 occurring before operation S520, or vice versa) or may occur simultaneously, substantially simultaneously, or with at least some temporal overlap. Further, it is understood that in various embodiments, operation S520 may be performed based on (or conditioned on) operation S510 verifying the vender CA trust, or operation S510 may be performed based on (or conditioned on) operation S520 verifying the digital certificate.

Figure 6:
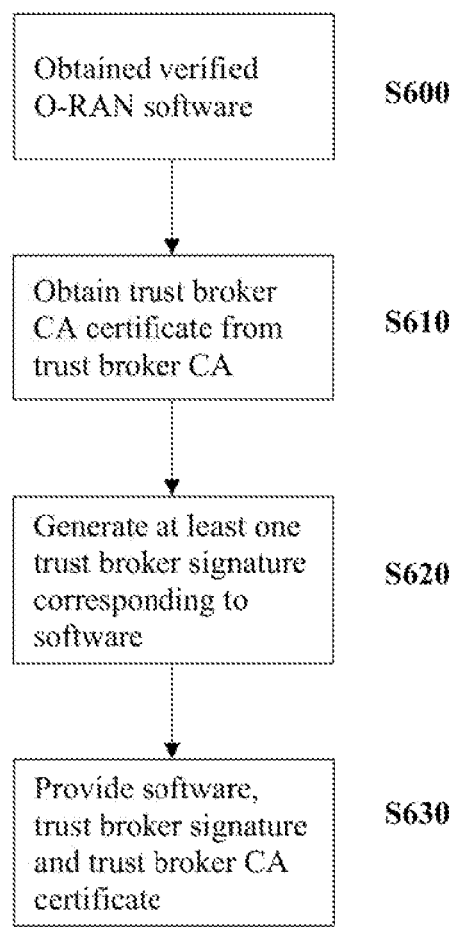
FIG. 6 illustrates a flowchart of a method for performing a trust broker attestation of verified software provided by a vendor, according to one or more embodiments.

FIG. 6 illustrates a flowchart of a method for performing a trust broker attestation of verified software provided by a vendor, according to one or more embodiments. The method of FIG. 6 may correspond to operation S420 in FIG. 4, and may be performed by a trust broker according to an embodiment.

Referring to FIG. 6, at operation S600, the trust broker obtains verified software. Here, the software may be verified in accordance with the method described above with reference to FIG. 5.

At operation S610, the trust broker obtains a trust broker CA certificate from a trust broker CA. For example, the trust broker may generate a certificate signing request (CSR) including a public key and submit the CSR to the trust broker CA. The trust broker may receive a certificate (trust broker CA certificate) from the trust broker CA in response. The certificate may be an X.509 certificate including the trust broker's public key (i.e., public key submitted with the CSR).

At operation S620, the trust broker generates at least one trust broker signature corresponding to the software, using the trust broker CA certificate. For example, the trust broker may apply a predetermined hash function to at least one of the software image, the scan results, and the SBOM, and encrypt the resulting digest using its private key corresponding to the public key included in the obtained trust broker CA certificate.

It is understood that, in various embodiments, operations S610 and S620 may occur in either order (i.e., operation S610 occurring before operation S620, or vice versa) or may occur simultaneously, substantially simultaneously, or with at least some temporal overlap. Further, it is understood that in various embodiments, operation S620 may be performed based on (or conditioned on) operation S610 enrolling a digital certificate with the trust broker CA in operation S610.

At operation S630, the trust broker provides the software image, the trust broker signature, and the trust broker CA certificate. For example, trust broker may bundle, combine, or otherwise associate the software components, signatures, and digital certificate together, and make them available to the O-RAN system (e.g., by storing in a trust broker registry in the trust broker framework that may be accessible to an O-RAN operator or O-Cloud operator). The O-RAN system customer (e.g., O-RAN/O-Cloud operator) may pull or obtain the software bundle over a secure connection (e.g., TLS 1.2 or 1.3 connectivity) from the trust broker (e.g., trust broker registry) for onboarding. Here, the O-RAN system customer may pull the software bundle into a private registry of the customer. Because there is a trust relationship between the trust broker and the O-RAN system (e.g., telco operator, O-RAN operator, and/or O-Cloud operator), the software can be verified by verifying the trust broker signature(s) using the trust broker CA certificate before installation in the O-RAN system or O-Cloud.

Figure 7:
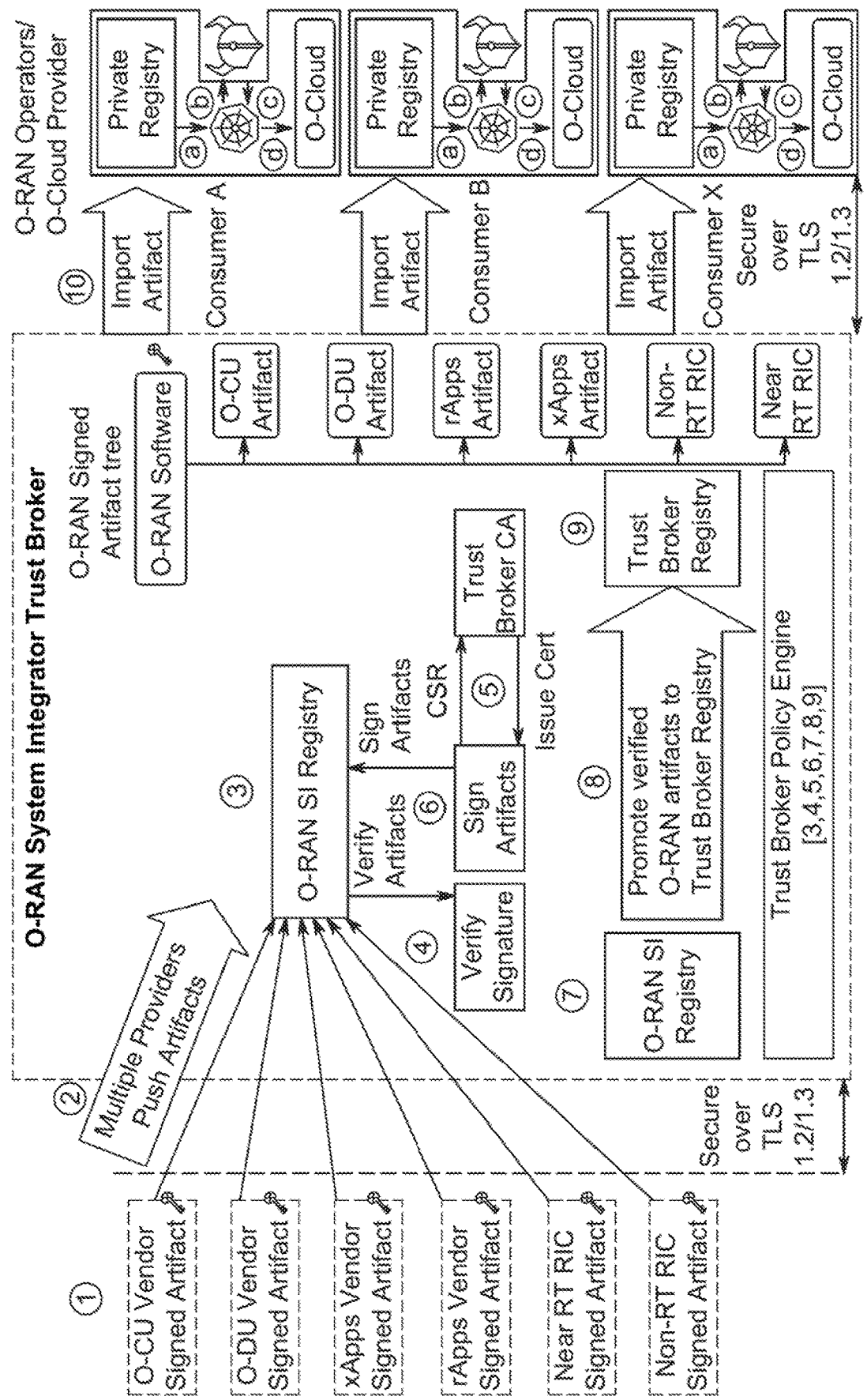
FIG. 7 illustrates a system flow diagram for implementing an O-RAN SI trust broker according to one or more embodiments.

FIG. 7 illustrates a system flow diagram for implementing an O-RAN SI trust broker according to one or more embodiments. Referring to FIG. 7, at (1), various O-RAN vendors build the software images and sign artefacts of the software images (e.g., sign the software images after successful image scans for vulnerabilities). The O-RAN vendors or providers are responsible for delivering O-RAN software components for O-RU, O-DU, O-CU, near-RT RIC, RT RIC, SMO, xApps, rApps, Orchestration, operating system (OS), etc. In the illustrated O-RAN architecture, there are multiple different O-RAN vendors.

At (2), the O-RAN vendors push the signed images (as an example of the signed artefacts) to an O-RAN SI registry of an O-RAN trust broker over a secure connection (e.g., TLS 1.2 or 1.3 connectivity). The O-RAN trust broker according to one or more embodiments is managed by the O-RAN System Integrator. Further, the O-RAN System Integrator may be a third party O-RAN System Integrator, an O-RAN vendor, or an O-RAN operator (i.e., the telco operator that provides O-RAN services to customer).

At (3), O-RAN software images are made available to the O-RAN SI registry.

At (4), the O-RAN trust broker according to one or more embodiments implements a policy engine to verify the image signatures received from various vendors to ensure authenticity and integrity of the images. For example, the O-RAN trust broker may verify the image signatures in accordance with the method described above with reference to FIG. 5.

Based on verifying a software image, the O-RAN trust broker attests to its trust by signing the software image with its own private key. To this end, at (5), the O-RAN trust broker policy engine sends a Certificate Signing Request (CSR) to a trust broker certificate authority (CA), and the trust broker CA issues a valid certificate.

At (6), the O-RAN trust broker policy engine signs the image. This process is repeated for each of the O-RAN software images (artifacts) from multiple suppliers. For example, this process may be as described above with reference to FIG. 6. The signed artifacts may be stored in the O-RAN SI registry.

At (7), the O-RAN trust broker policy engine builds artifacts of all signed O-RAN images from multiple suppliers, and adds metadata of the O-RAN artifacts as well as a corresponding signature for the metadata. The artifacts may be bundled and the bundled artifacts as well as the metadata may be stored in the O-RAN SI registry.

At (8), the O-RAN trust broker promotes successfully signed (i.e., verified and attested) O-RAN software bundled with artifact signatures and certificates to a trust broker registry.

At (9), the O-RAN trust broker attested O-RAN software is made available in the O-RAN trust broker registry.

At (10), various O-RAN operators or O-Cloud operators can pull O-RAN software from the trust broker registry over a secure connection (e.g., TLS 1.2/1.3 connection).

According to one or more embodiments, the O-RAN trust broker and the O-RAN operators/O-Cloud operators (i.e., the operator that manages a complete cloud infrastructure for O-RAN, e.g., public cloud operator, private cloud providers, etc.) have a trust relationship. Still referring to FIG. 7, a process flow for onboarding trust broker attested O-RAN software to an O-RAN system in accordance with one or more example embodiments will now be described. At (a), the O-RAN operator/O-Cloud operator securely pulls an O-RAN Software image from the O-RAN trust broker to its private registry. At (b), the O-RAN operator/O-Cloud operator orchestrator pulls the container image from private registry. At (c), the O-RAN operator/O-Cloud operator implements an admission controller, e.g., an open policy agent (OPA), to verify the image signature. At (d), based on a successful verification of the image signature, the software image can be deployed into the O-Cloud. Steps (a) to (d) can be applied by multiple consumers (i.e., O-RAN operators, O-Cloud operators).

Figure 8:
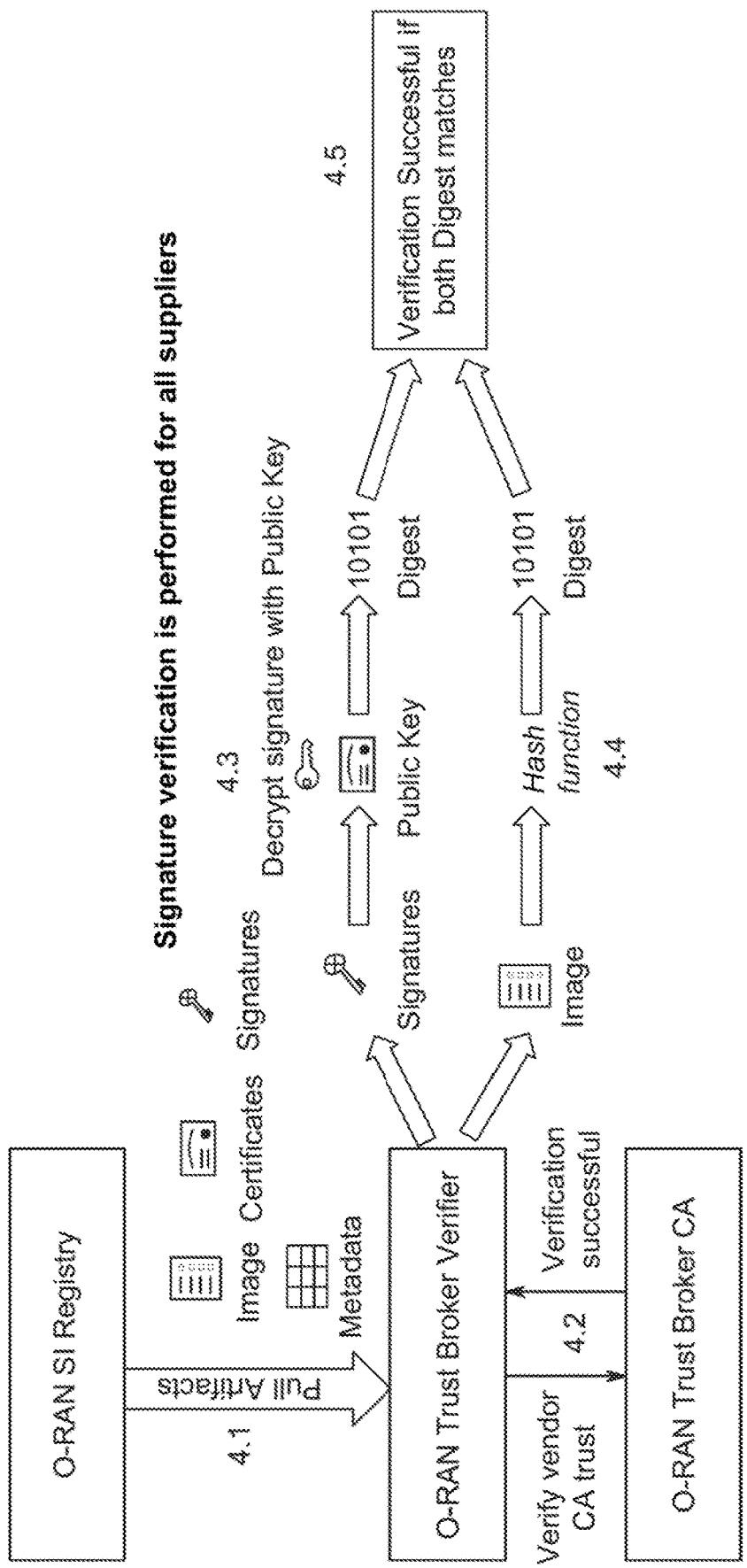
FIG. 8 illustrates a flow diagram for a trust broker signature verification according to one or more embodiments.

FIG. 8 illustrates a flow diagram for a trust broker signature verification according to one or more embodiments.

Referring to FIG. 8, at (4.1), a trust broker verifier (e.g., a policy engine) pulls vendor-supplied software artifacts from the SI registry. The pulled artifacts include a software image, a digital signature, and a vendor CA digital certificate. The pulled artifacts may further include at least one of metadata (including, e.g., an SBOM) and a scan report (e.g., based on a vulnerability scan performed by the vendor prior to signing the software image).

At (4.2), the trust broker verifies the vendor CA trust. For example, the trust broker (or the trust broker CA) may previously receive and/or install digital certificates issued by each of the vendors' CAs (e.g., vendor CA root certificates). In this case, the trust broker (or the trust broker CA) may use a trusted public key included in the corresponding vendor CA certificate to decrypt and verify the signature included in the digital certificate transmitted with the software image (and signed by the vendor CA using the private key corresponding to the trusted public key). If the verification fails, the trust broker cannot establish the trustworthiness of the digital signature included with the software image, and may take at least one predetermined action (e.g., deletes the software image, reports the source of the software image, blacklists the source of the software image, etc.).

Upon successful verification of the vendor CA trust, the trust broker verifies the digital signature included with the software. According to an embodiment, at (4.3) the trust broker verifier decrypts the signature using the public key in the digital certificate transmitted with the software image. At (4.4), the trust broker verifier applies a predetermined hash function (i.e., the same hash function used to generate the signature) to the software image to obtain a resulting hash value or digest. Based on the decrypted signature matching the hash digest at (4.5), the trust broker determines the verification to be successful, i.e., successfully verifies the authenticity and integrity of the software. Otherwise, the trust broker does not successfully verify the software and may take at least one predetermined action (e.g., deletes the software image, reports the source of the software image, blacklists the source of the software image, etc.).

Figure 9A:
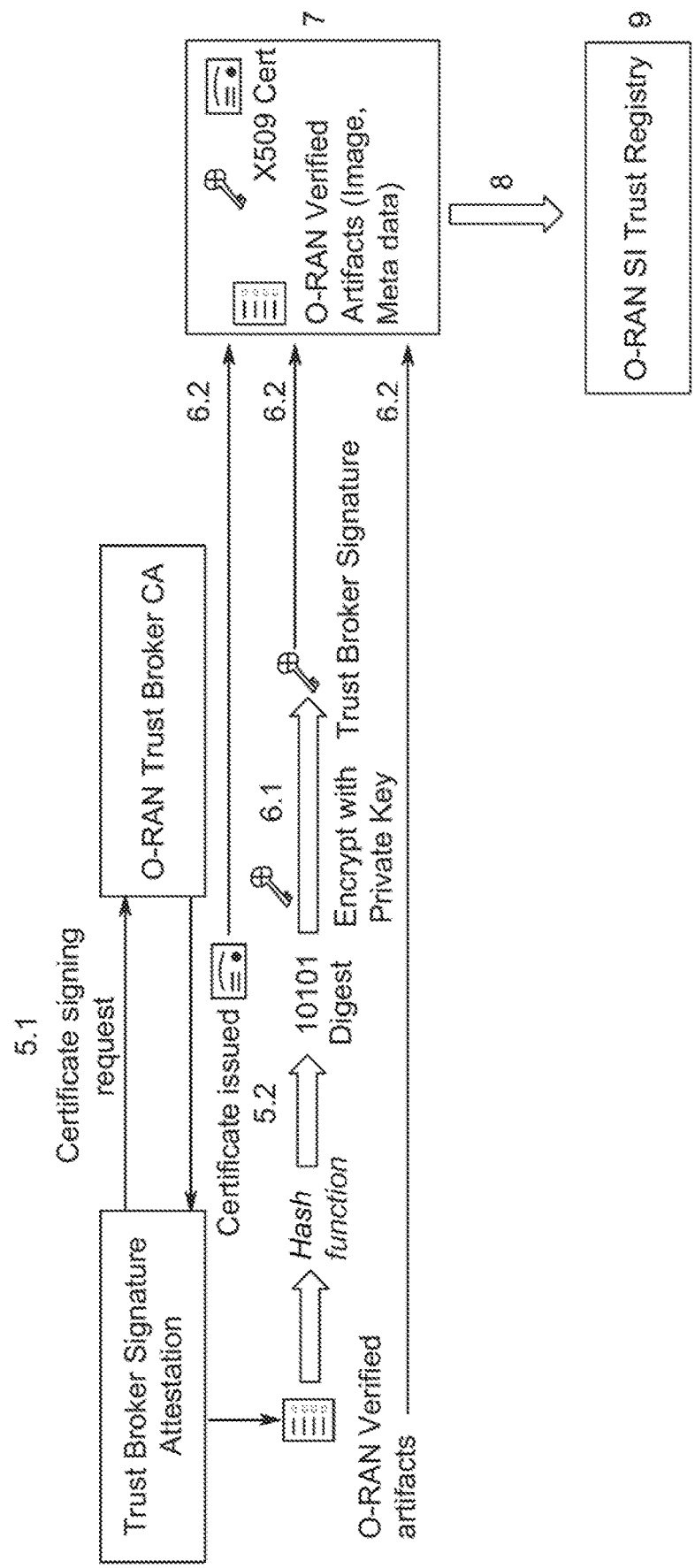
FIG. 9A illustrates a flow diagram for a trust broker signature attestation according to one or more embodiments.

FIG. 9A illustrates a flow diagram for a trust broker signature attestation according to one or more embodiments.

Referring to FIG. 9A, the trust broker obtains a trust broker CA certificate from a trust broker CA. For example, the trust broker generates a certificate signing request (CSR) including a public key and submits the CSR to the trust broker CA at (5.1). At (5.2), the trust broker receives a certificate (trust broker CA certificate) issued by the trust broker CA in response to the CSR. The certificate may be an X.509 certificate including the trust broker's public key submitted with the CSR.

At (6.1), the trust broker generates at least one trust broker signature corresponding to the software, using the trust broker CA certificate. Specifically, the trust broker applies a predetermined hash function to at least one of the software image, the metadata, and the scan results, and encrypts the resulting digest(s) using its private key corresponding to the public key included in the obtained trust broker CA certificate.

Figure 9B:
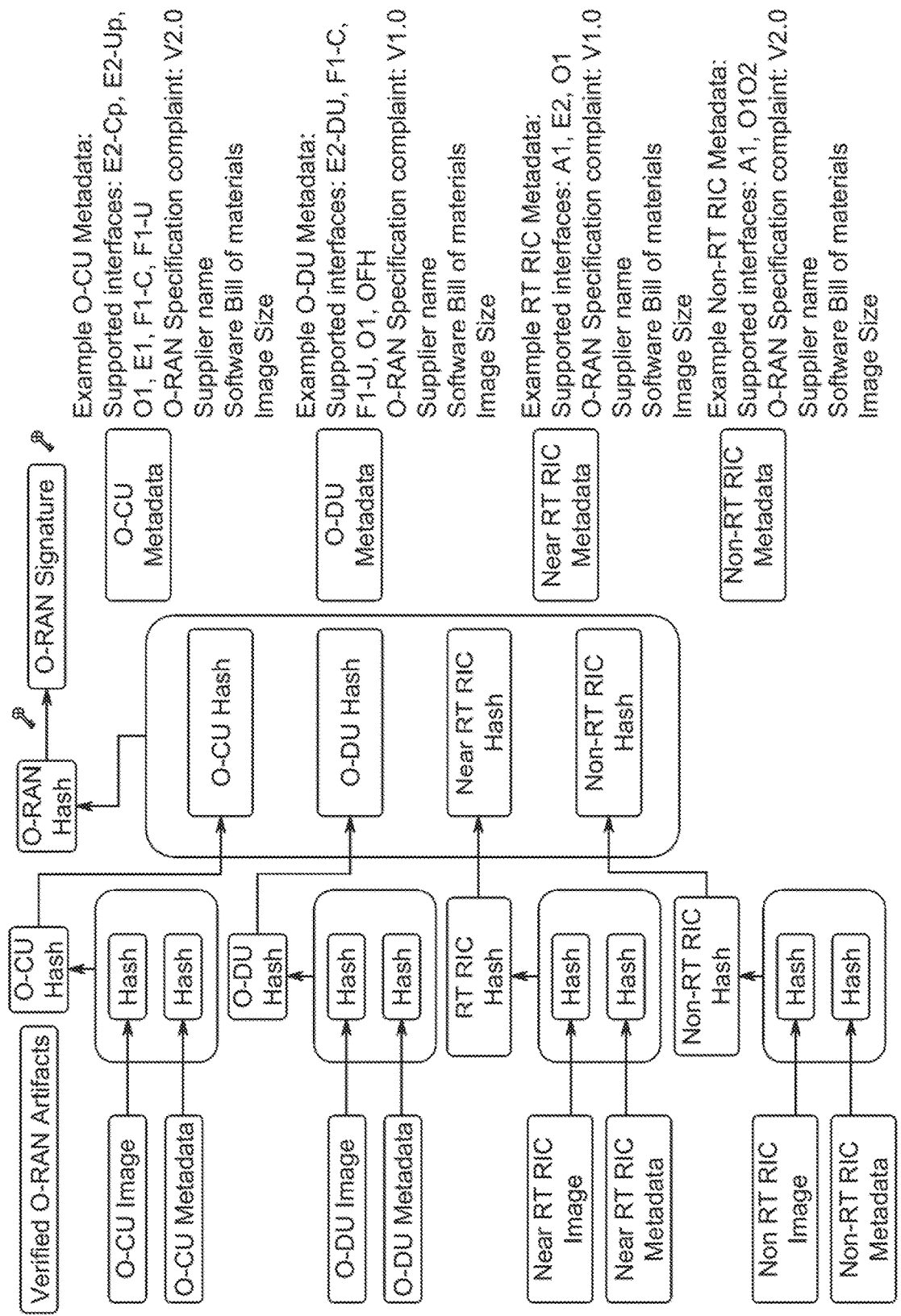
FIG. 9B illustrates a detailed view of artifact signatures according to an example embodiment.

At (6.2) and (7), the trust broker bundles the software image, the additional components (e.g., the metadata and/or the scan results), the trust broker signature(s), and the trust broker CA certificate and stores the bundle in the O-RAN SI registry. At (8), the trust broker promotes successfully signed (i.e., verified and attested) O-RAN software bundled with artifact signatures and certificates to a trust broker registry. At (9), the O-RAN trust broker attested O-RAN software is made available in the O-RAN trust broker registry FIG. 9B illustrates a detailed view of artifact signatures according to an example embodiment. Referring to FIG. 9B, a software image and corresponding metadata may be input to a hash function to produce a hash value. Here, the software image may be of any software implemented in an O-RAN architecture, such as an O-CU image, and O-DU image, a Near RT RIC image, and a Non-RT RIC image. The metadata may include at least one of information on supported interfaces, information indicating a version of the O-RAN specification with which the software image is compliant, a supplier name, an SBOM, and an image size. The hash value is encrypted by the private key of the trust broker to obtain the encrypted signature.

Figure 10:
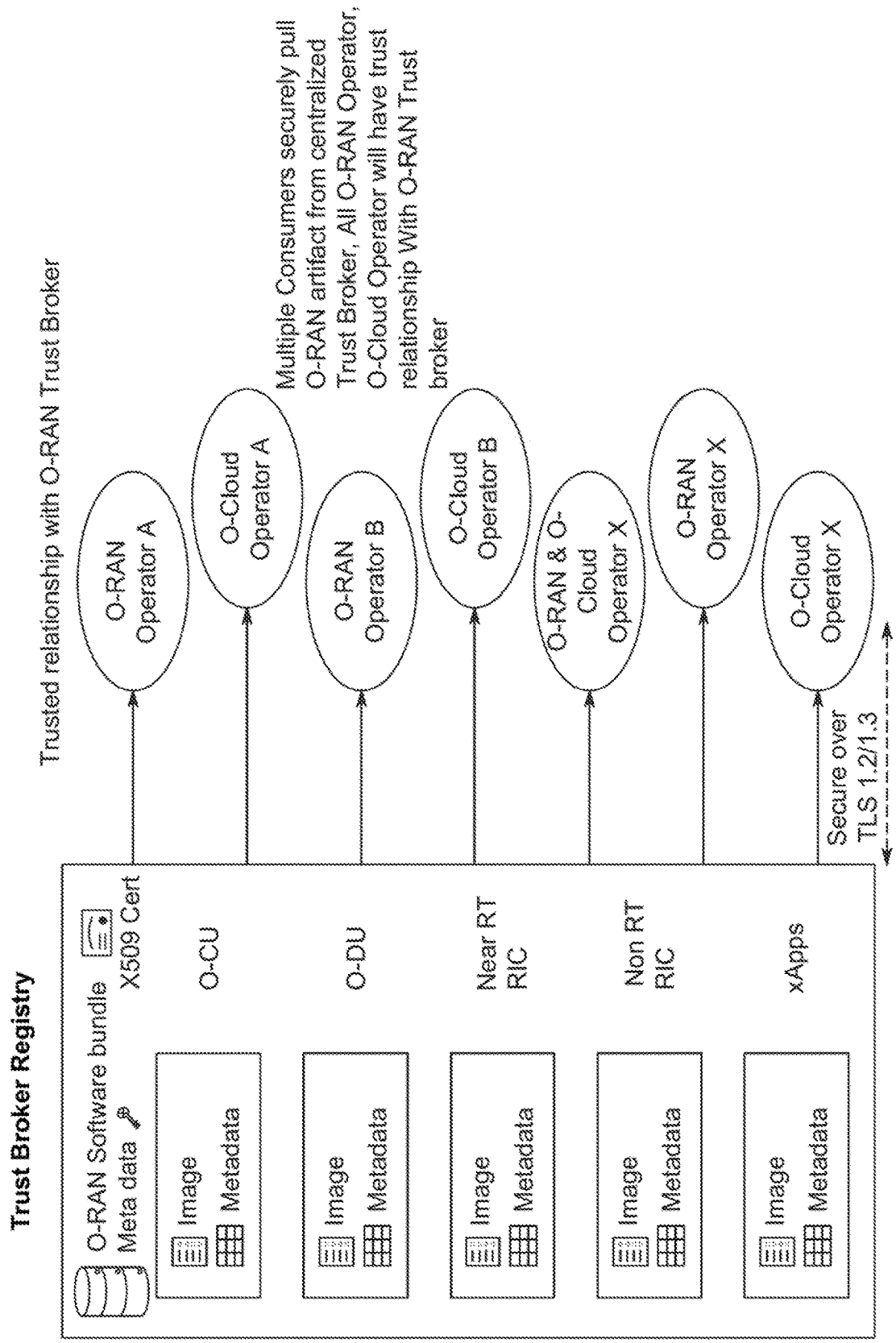
FIG. 10 illustrates a functional block diagram of a trust broker registry according to one or more embodiments.

FIG. 10 illustrates a functional block diagram of a trust broker registry according to one or more embodiments. Referring to FIG. 10, a plurality of O-RAN customers or operators (e.g., a plurality of different O-RAN operators and a plurality of different O-Cloud operators) have a trust relationship with the O-RAN trust broker in accordance with example embodiments, and may securely pull (e.g., over a TLS 1.2/1.3 connection) desired artifacts from the centralized trust broker for onboarding onto their systems/clouds.

Figure 11:
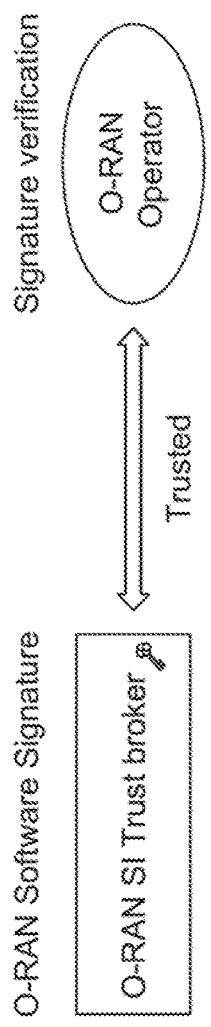
FIG. 11 illustrates a signature and verification model according to an embodiment.

FIG. 11 illustrates a signature and verification model according to an embodiment. Referring to FIG. 11, the signature and verification model according to the present embodiment is one in which the software is signed by the O-RAN trust broker according to one or more embodiments, and the signature is verified by the O-RAN operator (i.e., the telco operator that provides O-RAN services to customer). In this model, the O-RAN operator is responsible for O-RAN software onboarding and O-RAN software deployment. The O-RAN operator has a trust relationship with the O-RAN SI trust broker. Further, the O-RAN operator can verify the signature during onboarding of the software to the O-RAN private registry and before deployment. The O-RAN operator may sign the software in the registry to mitigate risks associated with an internal bad actor tampering the software. The O-RAN operator can also implement admission control techniques to validate the signature.

Figure 12:
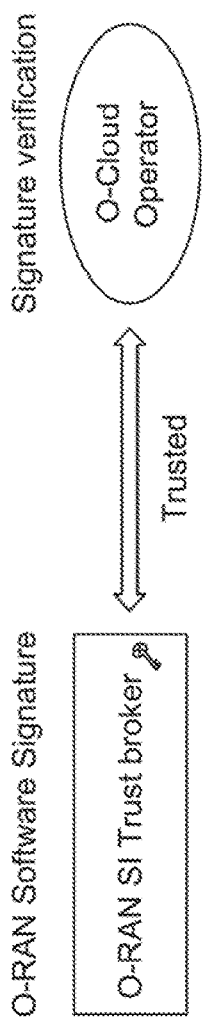
FIG. 12 illustrates a signature and verification model according to another embodiment.

FIG. 12 illustrates a signature and verification model according to another embodiment. Referring to FIG. 12, the signature and verification model according to the present embodiment is one in which the software is signed by the O-RAN trust broker according to one or more embodiments, and the signature is verified by the O-Cloud operator (i.e., the operator that manages complete loud infrastructure for O-RAN, e.g., public cloud operator, private cloud providers, etc.). In this model, the O-Cloud operator is responsible for O-RAN software onboarding and O-RAN software deployment. The O-Cloud operator has a trust relationship with O-RAN SI trust broker. The O-RAN operator has full trust with the O-Cloud operator, e.g., private cloud data center owned by O-RAN operator. The O-Cloud operator can verify the signature during onboarding of the software to the O-RAN private registry and before deployment. The O-Cloud operator may sign the software in the registry to mitigate risks associated with internal bad actor tampering the software. Further, the O-Cloud operator can implement admission control techniques to validate the signature.

Figure 13:
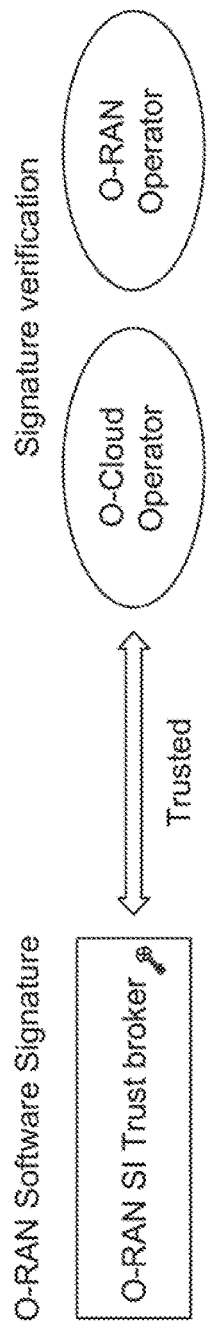
FIG. 13 illustrates a signature and verification model according to another embodiment.

FIG. 13 illustrates a signature and verification model according to another embodiment. Referring to FIG. 13, the signature and verification model according to the present embodiment is one in which the software is signed by the O-RAN trust broker according to one or more embodiments, and the signature is verified by both the O-Cloud operator and the O-RAN operator. In this model, the O-Cloud operator is responsible for O-RAN software onboarding and O-RAN software deployment. The O-Cloud operator and O-RAN operator have a trust relationship with the O-RAN SI trust broker. The O-RAN operator may not have a trust relationship with the O-Cloud operator, e.g., public cloud and edge cloud providers for O-RAN. Both the O-RAN operator and the O-Cloud operator can verify the signature during onboarding of the software to the O-RAN private registry and before deployment. The O-RAN operator and the O-Cloud operator may sign the software in the registry to mitigate risks associated with an internal bad actor tampering the software. The O-Cloud operator can implement admission control techniques to validate the signature.

Figure 14:
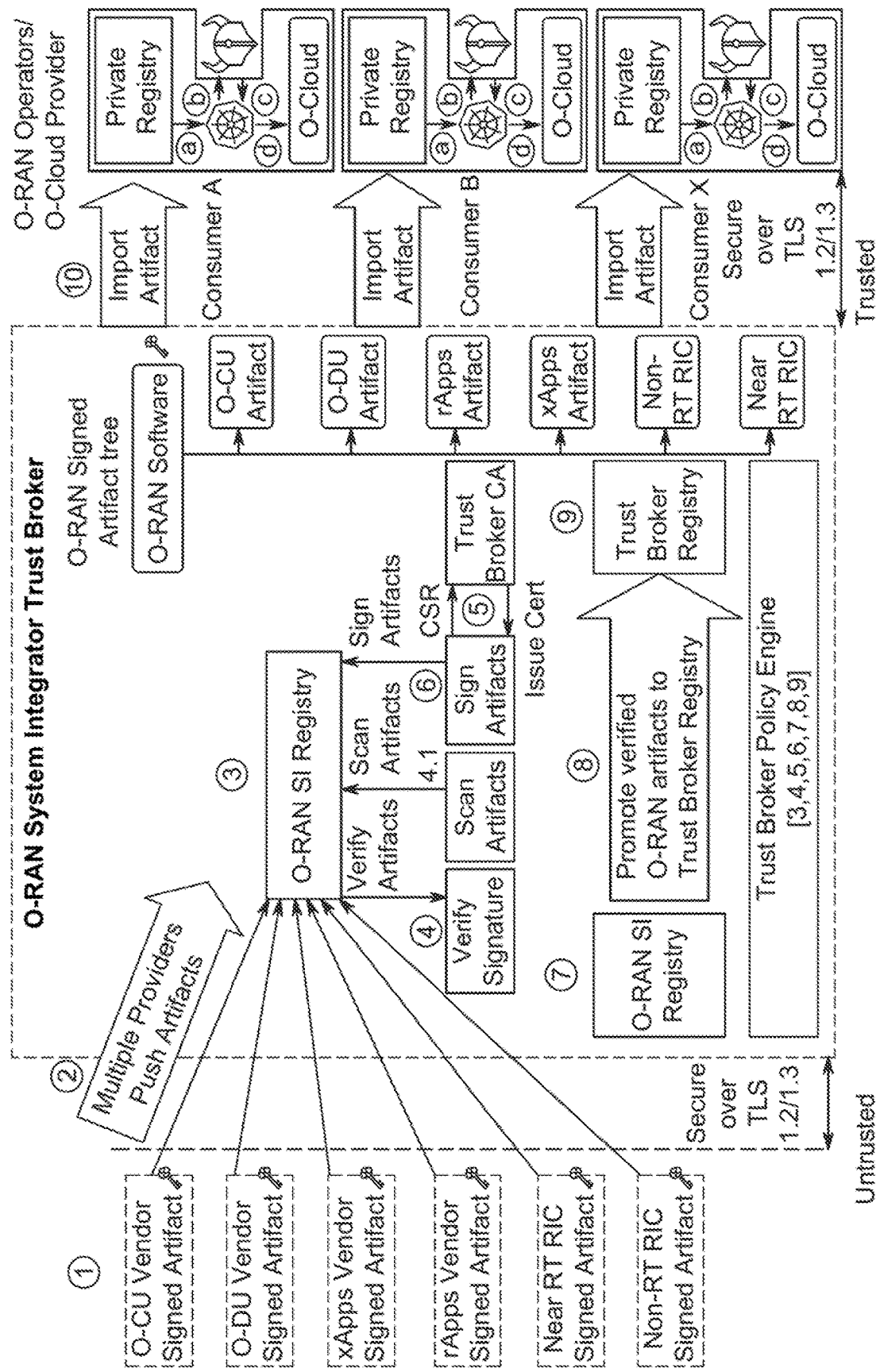
FIG. 14 illustrates a system flow diagram for implementing an O-RAN system integrator trust broker according to one or more other embodiments.

FIG. 14 illustrates a system flow diagram for implementing an O-RAN system integrator trust broker according to one or more other embodiments. Referring to FIG. 14, at (1), various O-RAN vendors build the software images and sign software artefacts (e.g., sign the software images after successful image scans for vulnerabilities). The O-RAN vendors or providers are responsible for delivering O-RAN software components for O-RU, O-DU, O-CU, near-RT RIC, RT RIC, SMO, xApps, rApps, Orchestration, operating system (OS), etc. In the O-RAN architecture, there are multiple different O-RAN vendors.

At (2), the O-RAN vendors push the signed images (as an example of the signed artifacts) to an O-RAN SI registry of an O-RAN trust broker over a secure connection (e.g., TLS 1.2 or 1.3 connectivity). The O-RAN trust broker according to one or more embodiments is managed by the O-RAN System Integrator. Further, the O-RAN System Integrator may be a third party O-RAN System Integrator, an O-RAN vendor, or an O-RAN operator (i.e., the telco operator that provides O-RAN services to customer).

At (3), O-RAN software images are made available to the O-RAN SI registry.

At (4), the O-RAN trust broker according to one or more embodiments implements a policy engine to verify the image signatures received from various vendors to ensure authenticity and integrity of the images. For example, the O-RAN trust broker may verify the image signatures in accordance with the method described above with reference to FIG. 5.

At (4.1), the O-RAN trust broker scans the supplier images for known vulnerabilities to check if there are any critical and/or high severity vulnerabilities before proceeding with software signing. In this case, if the scan determines or detects a predetermined, critical, and/or high severity vulnerability, the trust broker may not proceed to software attestation and may take another predetermined action (e.g., delete the software image, report the source of the software image, blacklist the source of the software image, etc.).

Based on verifying the signature of a software image and a successful scan thereof, the O-RAN trust broker attests to its trust by signing the software image with its own private key. To this end, at (5), the O-RAN trust broker policy engine sends a Certificate Signing Request (CSR) to a trust broker certificate authority (CA), and the trust broker CA issues a valid certificate.

At (6), the O-RAN trust broker policy engine signs the image. This process is repeated for each of the O-RAN software images (artifacts) from multiple suppliers. For example, this process may be as described above with reference to FIG. 6. The signed artifacts may be stored in the O-RAN SI registry.

At (7), the O-RAN trust broker policy engine builds artifacts of all signed O-RAN images from multiple suppliers, and adds metadata of the O-RAN artifacts as well as a corresponding signature for the metadata. The artifacts may be bundled and the bundled artifacts as well as the metadata may be stored in the O-RAN SI registry At (8), the O-RAN trust broker promotes successfully signed O-RAN software bundled with artifact signatures and certificates to a trust broker registry.

At (9), the O-RAN trust broker attested O-RAN software is made available in the O-RAN trust broker registry.

At (10), various O-RAN operators or O-Cloud operators can pull O-RAN software from the trust broker registry over a secure connection (e.g., TLS 1.2/1.3 connection).

According to one or more embodiments, the O-RAN trust broker and the O-RAN operators/O-Cloud operators (i.e., the operator that manages a complete cloud infrastructure for O-RAN, e.g., public cloud operator, private cloud providers, etc.) have a trust relationship. Still referring to FIG. 14, a process flow for onboarding trust broker attested O-RAN software to an O-RAN system in accordance with one or more example embodiments will now be described. At (a), the O-RAN operator/O-Cloud operator securely pulls an O-RAN Software image from the O-RAN trust broker to its private registry. At (b), the O-RAN operator/O-Cloud operator orchestrator pulls the container image from private registry. At (c), the O-RAN operator/O-Cloud operator implements an admission controller, e.g., an open policy agent (OPA), to verify the image signature. At (d), based on a successful verification of the image signature, the software image can be deployed into the O-Cloud. Steps (a) to (d) can be applied by multiple consumers (i.e., O-RAN operators, O-Cloud operators).

Figure 15:
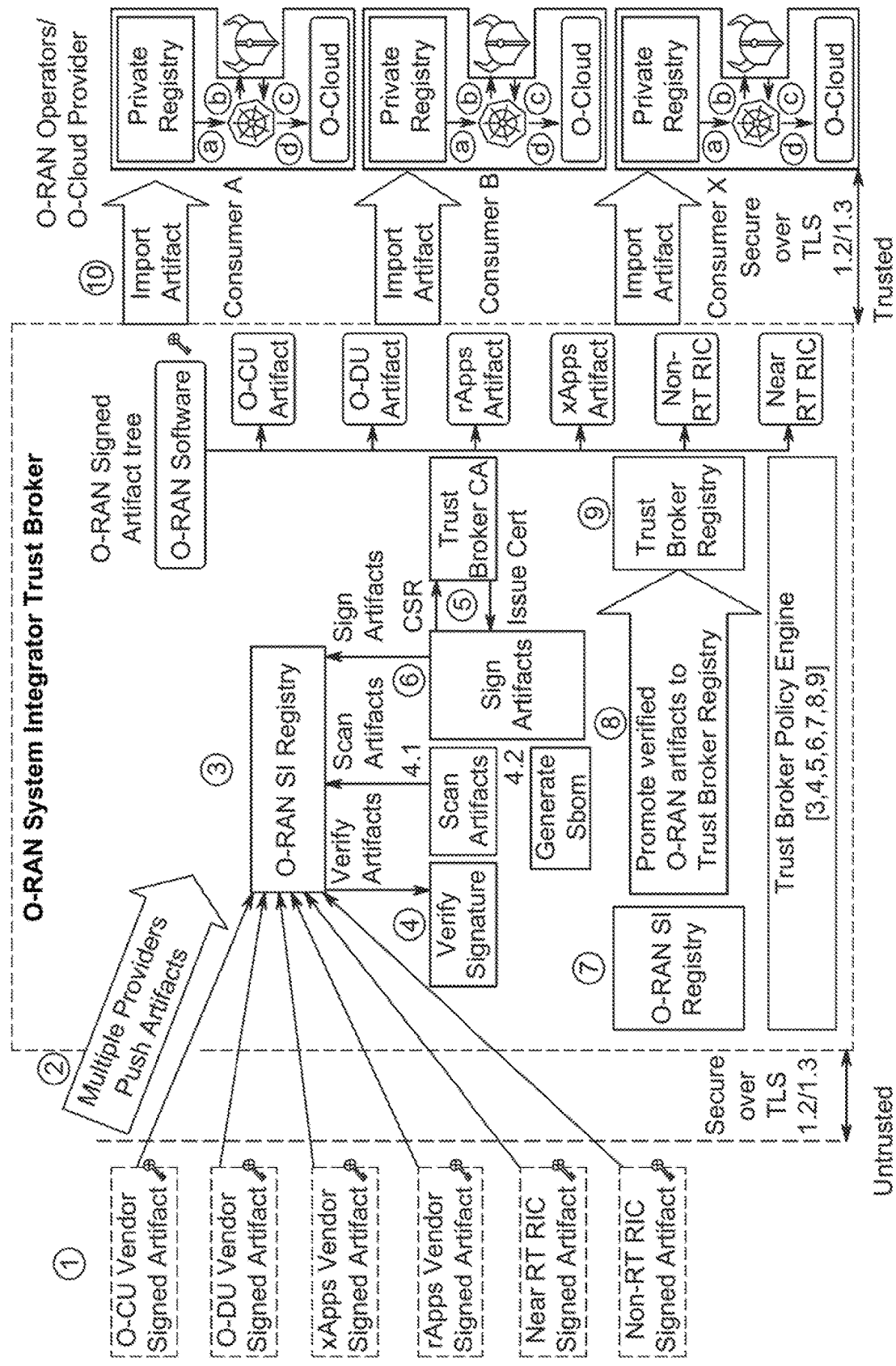
FIG. 15 illustrates a system flow diagram for implementing an O-RAN system integrator trust broker according to one or more other embodiments.

FIG. 15 illustrates a system flow diagram for implementing an O-RAN system integrator trust broker according to one or more other embodiments. Referring to FIG. 15, at (1), various O-RAN vendors build the software images and sign artefacts of the software images (e.g., sign the software images after successful image scans for vulnerabilities). The O-RAN vendors or providers are responsible for delivering O-RAN software components for O-RU, O-DU, O-CU, near-RT RIC, RT RIC, SMO, xApps, rApps, Orchestration, operating system (OS), etc. In the O-RAN architecture, there are multiple different O-RAN vendors.

At (2), the O-RAN vendors push the signed images (as an example of the signed artefacts) to an O-RAN SI registry of an O-RAN trust broker over a secure connection (e.g., TLS 1.2 or 1.3 connectivity). An O-RAN trust broker according to one or more embodiments is managed by the O-RAN System Integrator. Further, the O-RAN System Integrator may be a third party O-RAN System Integrator, an O-RAN vendor, or an O-RAN operator (i.e., the telco operator that provides O-RAN services to customer).

At (3), O-RAN software images are made available to the O-RAN SI Registry.

At (4), the O-RAN trust broker according to one or more embodiments implements a policy engine to verify the image signatures received from various vendors to ensure authenticity and integrity of the images. For example, the O-RAN trust broker may verify the image signatures in accordance with the method described above with reference to FIG. 5.

At (4.1), the O-RAN trust broker scans the supplier images for known vulnerabilities to check if there are any critical and/or high severity vulnerabilities before proceeding with software signing. In this case, if the scan determines or detects a predetermined, critical, and/or high severity vulnerability, the trust broker may not proceed to software attestation and may take another predetermined action (e.g., delete the software image, report the source of the software image, blacklist the source of the software image, etc.). In one or more other embodiment, step (4.1) may be omitted.

At (4.2), the O-RAN trust broker generates a SBOM. For example, the O-RAN trust broker may determine whether an SBOM is not available from the supplier, and may generate the SBOM based on determining that the SBOM is not available from or provided by the supplier.

Based on verifying the signature of a software image and a successful can thereof, the O-RAN trust broker attests to its trust by signing the software image with its own private key. To this end, at (5), the O-RAN trust broker policy engine sends a Certificate Signing Request (CSR) to a trust broker certificate authority (CA), and the trust broker CA issues a valid certificate.

At (6), the O-RAN trust broker policy engine signs the image and may also sign at least the SBOM. This process is repeated for each of the O-RAN software images (artifacts) from multiple suppliers. For example, this process may be as described above with reference to FIG. 6. The signed artifacts may be stored in the O-RAN SI registry.

At (7), the O-RAN trust broker policy engine builds artifacts of all signed O-RAN images from multiple suppliers, and adds metadata of the O-RAN artifacts as well as a corresponding signature for the metadata. The artifacts may be bundled and the bundled artifacts as well as the metadata may be stored in the O-RAN SI registry.

At (8), the O-RAN trust broker promotes successfully signed O-RAN software bundled with artifact signatures and certificates to a trust broker registry.

At (9), the O-RAN trust broker attested O-RAN software is made available in the O-RAN trust broker registry.

At (10), various O-RAN operators or O-Cloud operators can pull O-RAN software from the trust broker registry over a secure connection (e.g., TLS 1.2/1.3 connection).

According to one or more embodiments, the O-RAN trust broker and the O-RAN operators/O-Cloud operators (i.e., the operator that manages a complete cloud infrastructure for O-RAN, e.g., public cloud operator, private cloud providers, etc.) have a trust relationship. Still referring to FIG. 15, a process flow for onboarding trust broker attested O-RAN software to an O-RAN system in accordance with one or more example embodiments will now be described. At (a), the O-RAN operator/O-Cloud operator securely pulls an O-RAN Software image from the O-RAN trust broker to its private registry. At (b), the O-RAN operator/O-Cloud operator orchestrator pulls the container image from private registry. At (c), the O-RAN operator/O-Cloud operator implements an admission controller, e.g., an open policy agent (OPA), to verify the image signature. At (d), based on a successful verification of the image signature, the software image can be deployed into the O-Cloud. Steps (a) to (d) can be applied by multiple consumers (i.e., O-RAN operators, O-Cloud operators).

Figure 16A:
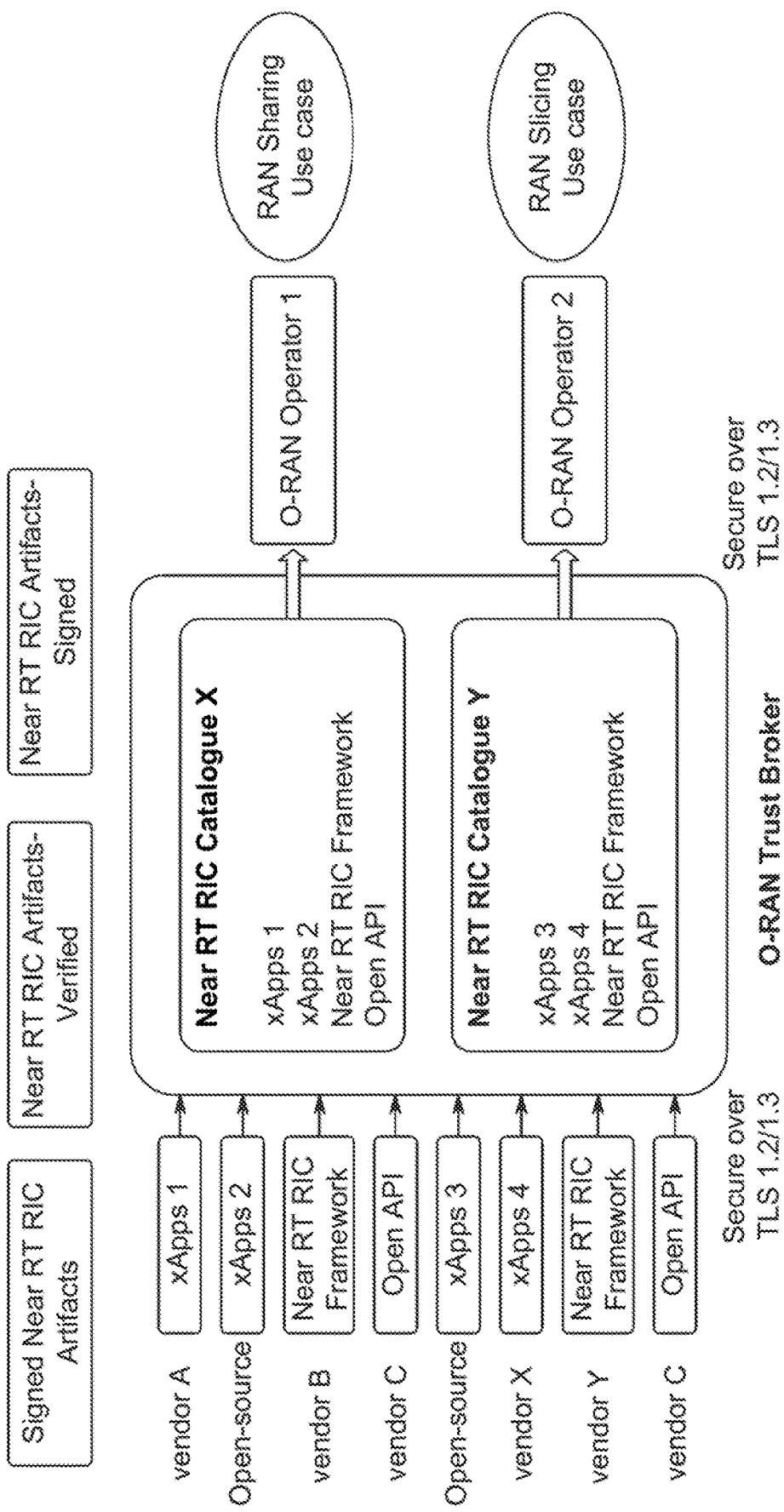
FIGS. 16A-16C are diagrams for illustrating an example scenario for implementing an O-RAN SI trust broker according to one or more embodiments.
Figure 16B:
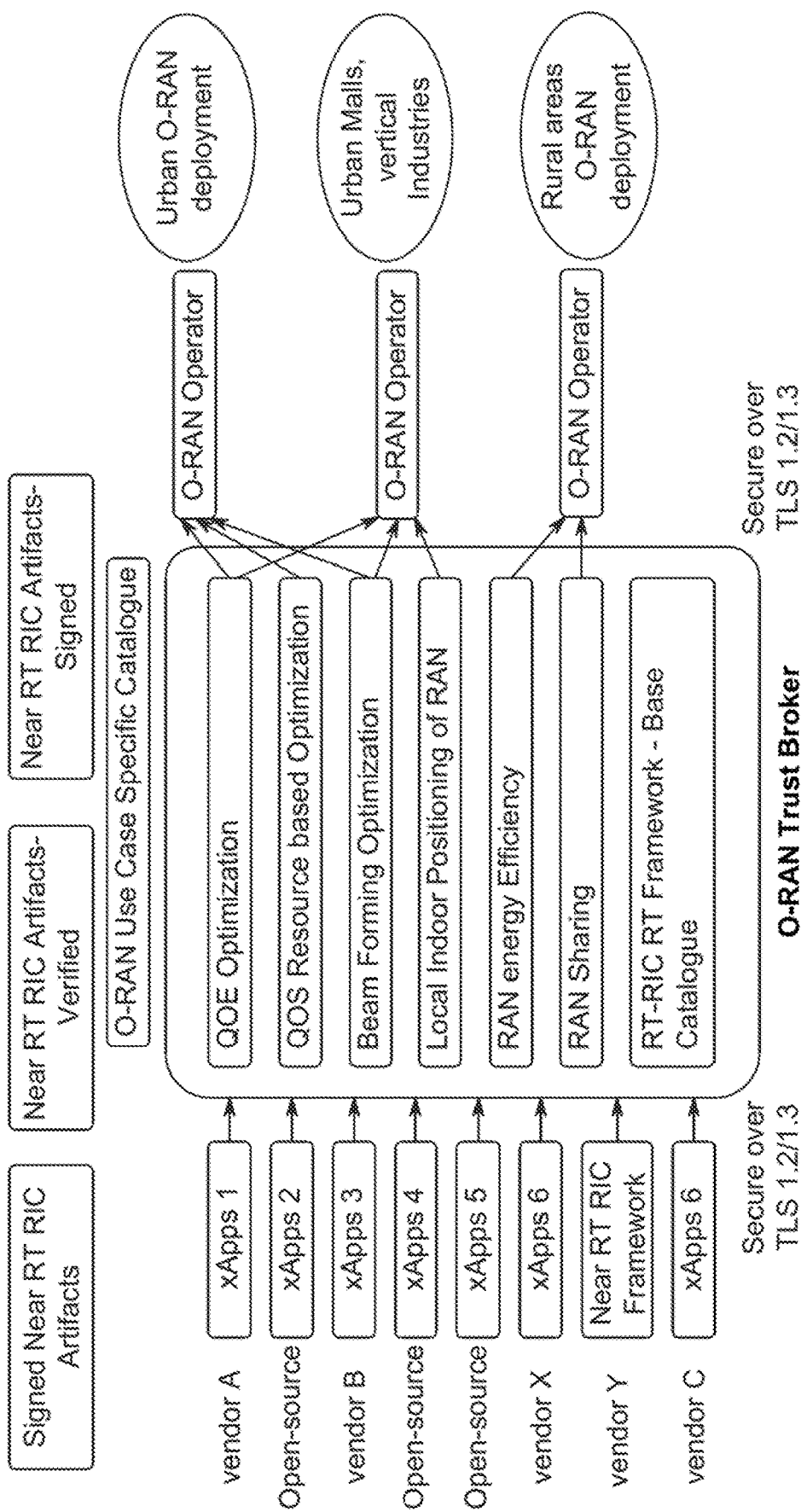
Figure 16C:
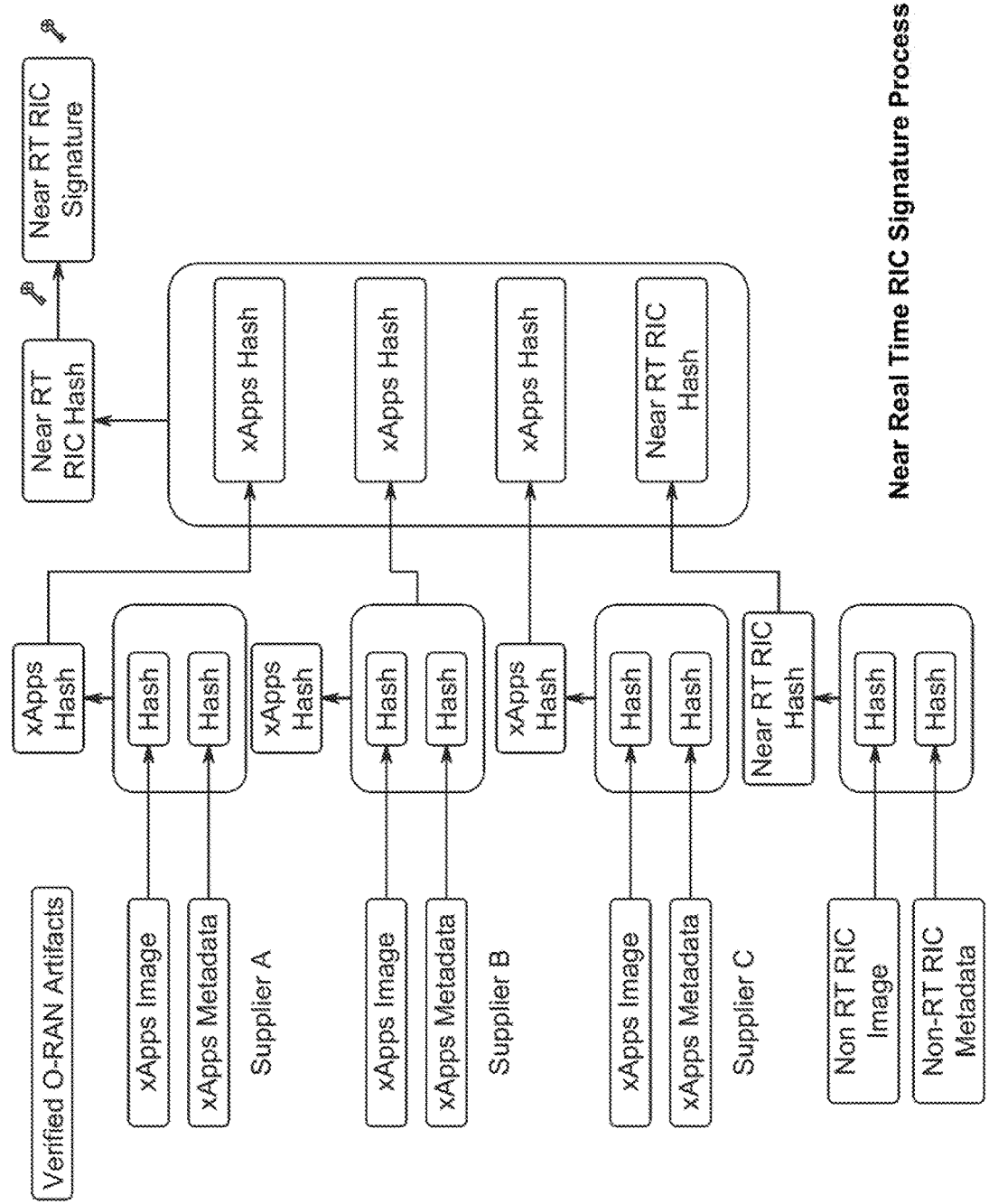

FIGS. 16A-16C are diagrams for illustrating an example scenario for implementing an O-RAN SI trust broker according to one or more embodiments. In the example scenario of FIGS. 16A-16C, a plurality of O-RAN operators obtain Near RT RIC software that is attested and secured by the O-RAN SI trust broker. Depending on an O-RAN operator's use cases and configurations, specific combinations of xApps, Near RT RIC framework, libraries, interfaces, and application programming interfaces (APIs) will be required. Near RT RIC software may be a collection of microservices, sourced from various RIC application vendors and the open-source community (in the case of xApps). With a cloud native architecture, frequent enhancements to xApps and the Near RT RIC may be expected in the continuous integration/continuous delivery (CI/CD) pipeline. Supply chain security for the Near RT RIC is therefore important. The trust broker framework in accordance with example embodiments resolves complexities and achieves security for O-RAN operators to manage various artifacts' verification and manage various software catalogues for different Near RT RICs.

Referring to FIG. 16A, in the example scenario of FIGS, a first O-RAN operator requires Near RT RIC software for implementing RAN sharing, while a second O-RAN operator requires Near RT RIC software for implementing RAN slicing. As can be seen, the different use cases require different catalogues or combinations of Near RT software (xApps, framework, APIs) supplied by different vendors or sources. In accordance with one or more embodiments, the O-RAN trust broker verifies the Near RT RIC software or artifacts, signs the verified artifacts to thereby establish their trust to various O-RAN operators, and provide the catalogues of software to the first and second O-RAN operators via secure communication. Because the centralized trust broker has a trust relationship with a plurality of O-RAN and/or O-Cloud operators, the integrity and authenticity of the software supplied by various vendors can be ensured.

FIG. 16B illustrates an example embodiment in which the O-RAN trust broker maintains a plurality of catalogues of various combinations of Near RT RIC software that respectively correspond to various functionalities or use cases. Based on these catalogues, each O-RAN operator can securely and conveniently pull or obtain the software it requires for its particular deployments.

FIG. 16C illustrates a detailed view of Near RT RIC artifact signatures according to an example embodiment. Referring to FIG. 16C, a Near RT RIC software image (e.g., xApps, Near RT RIC framework, etc.) and corresponding metadata may be input to a hash function to produce a hash value. The metadata may include at least one of information on supported interfaces, information indicating a version of the O-RAN specification with which the software image is compliant, a supplier name, an SBOM, and an image size. The hash value is encrypted by the private key of the trust broker to obtain the encrypted signature.

While the above-described example scenario is with reference to Near RT RIC software attestation, it is understood that the trust broker capabilities in accordance with example embodiments can also be leveraged for the Non-RT RIC as well.

Figure 17:
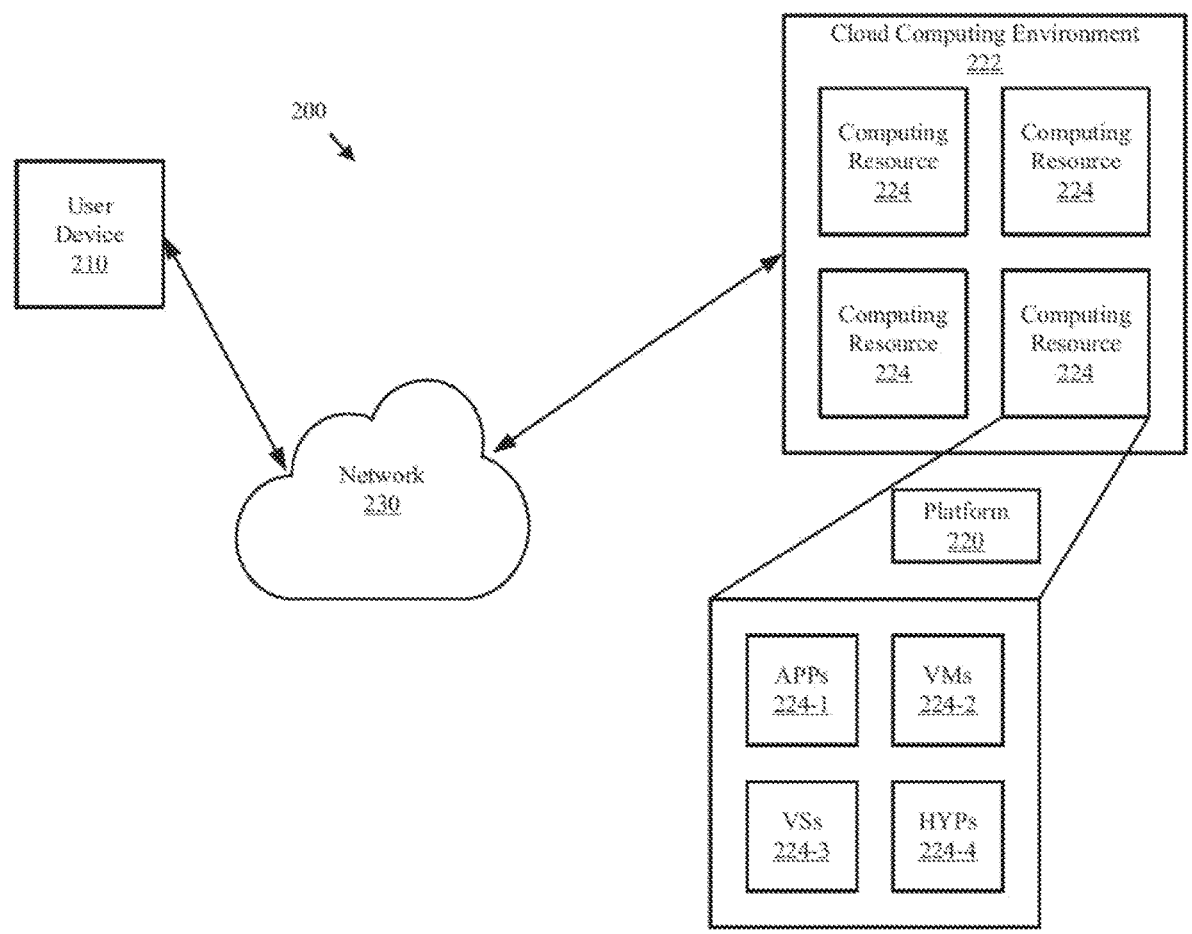
FIG. 17 is a diagram of an example environment in which systems and/or methods, described herein, may be implemented.
Figure 18:
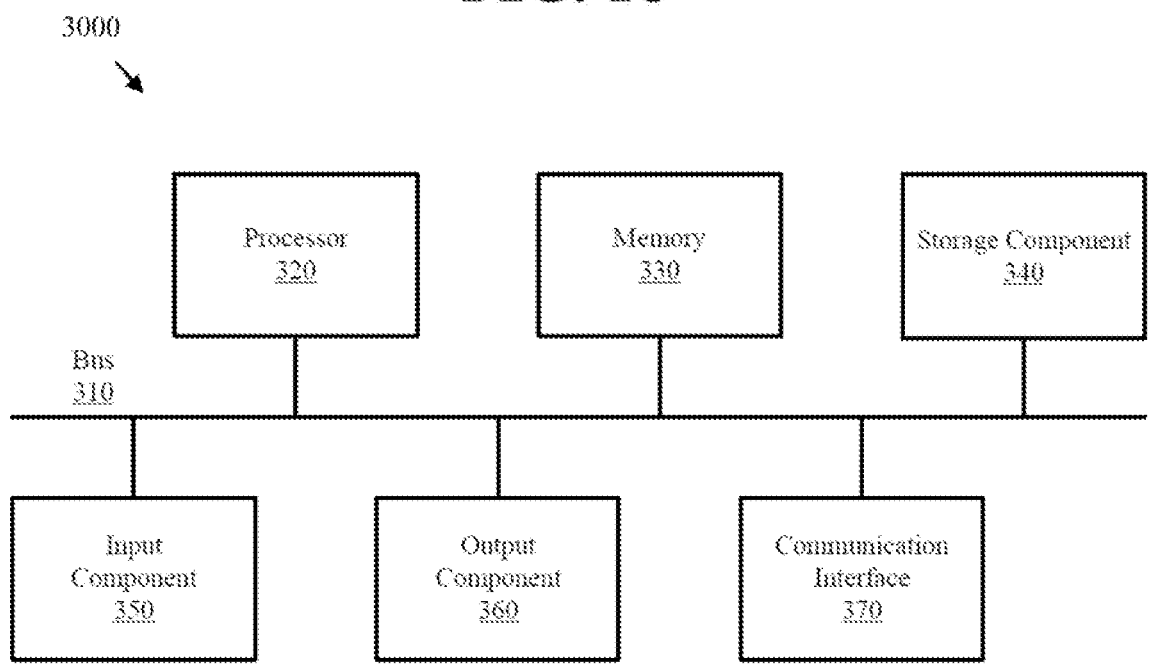
FIG. 18 is a diagram of example components of a device.

FIG. 17 is a diagram of an example environment 200 in which systems and/or methods, described herein, may be implemented. As shown in FIG. 17, environment 200 may include a user device 210, a platform 220, and a network 230. Devices of environment 200 may interconnect via wired connections, wireless connections, or a combination of wired and wireless connections. In embodiments, any of the functions and operations described above may be performed by any combination of elements illustrated in FIG. 17.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 17, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 16 are provided as an example. In practice, there may be additional devices and/or networks, fewer devices and/or networks, different devices and/or networks, or differently arranged devices and/or networks than those shown in FIG. 16. Furthermore, two or more devices shown in FIG. 16 may be implemented within a single device, or a single device shown in FIG. 16 may be implemented as multiple, distributed devices. Additionally, or alternatively, a set of devices (e.g., one or more devices) of environment 200 may perform one or more functions described as being performed by another set of devices of environment 200.

FIG. 17 is a diagram of example components of a device 3000. Device 3000 may correspond to user device 210 and/or platform 220. As shown in FIG. 17, device 3000 may include a bus 310, a processor 320, a memory 330, a storage component 340, an input component 350, an output component 360, and a communication interface 370.

Bus 310 includes a component that permits communication among the components of device 3000. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 3000. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 3000 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 3000 (e.g., a display, a speaker, and/or one or more light-emitting diodes (LEDs)).

Communication interface 370 includes a transceiver-like component (e.g., a transceiver and/or a separate receiver and transmitter) that enables device 3000 to communicate with other devices, such as via a wired connection, a wireless connection, or a combination of wired and wireless connections. Communication interface 370 may permit device 3000 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 3000 may perform one or more processes described herein. Device 3000 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software. The number and arrangement of components shown in FIG. 17 are provided as an example. In practice, device 3000 may include additional components, fewer components, different components, or differently arranged components than those shown in FIG. 17. Additionally, or alternatively, a set of components (e.g., one or more components) of device 3000 may perform one or more functions described as being performed by another set of components of device 3000.

In embodiments, any of the operations or processes described with reference to FIGS. 3-15 above may be implemented by or using any one of the elements illustrated in FIGS. 16 and 17.

The O-RAN trust broker framework according to various embodiments will verify authenticity, integrity and confidentiality of various O-RAN software components and further attest O-RAN software and establish trust with various O-RAN operators/O-Cloud operators. As a result, security for O-RAN is improved, and risks of any potential supply chain attacks and associated costs are reduced.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method, performed by at least one processor of a trust broker, for establishing trust of vendor-supplied Open Radio Access Network (O-RAN) software, the method comprising:
receiving a plurality of O-RAN software from a plurality of O-RAN software vendors, the plurality of O-RAN software respectively signed by the plurality of O-RAN software vendors;
for a software, among the plurality of O-RAN software, verifying a signature included with the software using a vendor certificate issued by a certificate authority (CA) of the corresponding vendor;
based on successful verification of the signature, performing a software attestation with respect to the software using a digital certificate issued by a CA of the trust broker; and
providing the attested software to an operator corresponding to an O-RAN system and with which the trust broker has a trust relationship,
wherein the performing the software attestation comprises:
submitting a certificate signing request (CSR) to the CA of the trust broker, the CSR including a public key of the trust broker;
obtaining the digital certificate issued by the CA of the trust broker, based on the certificate signing request, the digital certificate including the public key of the trust broker; and
generating at least one trust broker signature corresponding to the software, using a private key corresponding to the public key of the trust broker,
wherein the generating the at least one trust broker signature comprises:
generating a first trust broker signature by generating and encrypting, using the private key, a signature of the software;
generating a second trust broker signature by generating and encrypting, using the private key, a signature of a scan result corresponding to a vulnerability scan of the software; and
generating a third trust broker signature by generating and encrypting, using the private key, an SBOM of the software.

2. The method according to claim 1, wherein the receiving the plurality of software comprises receiving the software, the signature, the vendor certificate, and at least one of a Software Bill of Materials (SBOM) and a scan report corresponding to a vulnerability scan performed by the corresponding vendor.

3. The method according to claim 1, further comprising:
verifying trust of the CA of the corresponding vendor,
wherein the performing the software attestation comprises performing the software attestation based on successful verification of the trust of the CA and successful verification of the signature.

4. The method according to claim 3, wherein the verifying the trust of the CA of the corresponding vendor comprises decrypting and verifying a signature included in the vendor certificate using a key included in a pre-installed vendor CA certificate, from among a plurality of certificates previously-received from a plurality of CAs corresponding to the plurality of O-RAN software vendors.

5. The method according to claim 1, wherein the verifying the signature comprises:
decrypting the signature using a key included in the vendor certificate;
applying a hash function to the software to obtain a digest; and
determining whether the decrypted signature and the digest correspond to each other.

6. The method according to claim 1, further comprising at least one of:
performing, by the trust broker, the vulnerability scan of the software; and
generating the SBOM of the software.

7. The method according to claim 1, wherein the providing the attested software to the operator comprises:
storing a bundle comprising the software, the at least one trust broker signature, and the digital certificate in a trust broker registry; and
providing the bundle to at least one of an O-RAN operator and an O-Cloud operator corresponding to the O-RAN system for verification of the at least one trust broker signature and deployment in the O-RAN system, the at least one of the O-RAN operator and the O-Cloud operator having the trust relationship with the trust broker.

8. A system for establishing trust of vendor-supplied Open Radio Access Network (O-RAN) software, the system comprising:
at least one memory storing instructions; and
at least one processor configured to execute the instructions to:
receive a plurality of O-RAN software from a plurality of O-RAN software vendors, the plurality of O-RAN software respectively signed by the plurality of O-RAN software vendors;
for a software, among the plurality of O-RAN software, verify a signature included with the software using a vendor certificate issued by a certificate authority (CA) of the corresponding vendor;
based on successful verification of the signature, performing a software attestation with respect to the software using a digital certificate issued by a CA of a trust broker; and
provide the attested software to an operator corresponding to an O-RAN system and with which the trust broker has a trust relationship,
wherein the at least one processor is further configured to execute the instructions to perform the software attestation by:
submitting a certificate signing request (CSR) to the CA of the trust broker, the CSR including a public key of the trust broker;

obtaining the digital certificate issued by the CA of the trust broker, based on the certificate signing request, the digital certificate including the public key of the trust broker; and generating at least one trust broker signature corresponding to the software, using a private key corresponding to the public key of the trust broker, wherein the at least one processor is further configured to execute the instructions to:

generate a first trust broker signature by generating and encrypting, using the private key, a signature of the software;

generate a second trust broker signature by generating and encrypting, using the private key, a signature of a scan result corresponding to a vulnerability scan of the software; and generate a third trust broker signature by generating and encrypting, using the private key, an SBOM of the software.

9. The system according to claim 8, wherein the at least one processor is further configured to execute the instructions to receive the software, the signature, the vendor certificate, and at least one of a Software Bill of Materials (SBOM) and a scan report corresponding to a vulnerability scan performed by the corresponding vendor.

10. The system according to claim 8, wherein the at least one processor is further configured to execute the instructions to:

verify trust of the CA of the corresponding vendor; and perform the software attestation based on successful verification of the trust of the CA and successful verification of the signature.

11. The system according to claim 10, wherein the at least one processor is further configured to execute the instructions to verify the trust of the CA of the corresponding vendor by decrypting and verifying a signature included in the vendor certificate using a key included in a pre-installed vendor CA certificate, from among a plurality of certificates previously-received from a plurality of CAs corresponding to the plurality of O-RAN software vendors.

12. The system according to claim 8, wherein the at least one processor is further configured to execute the instructions to:

decrypt the signature using a key included in the vendor certificate;

apply a hash function to the software to obtain a digest; and determine whether the decrypted signature and the digest correspond to each other in order to verify the signature.

13. The system according to claim 8, wherein the at least one processor is further configured to execute the instructions to:

perform the vulnerability scan of the software; and/or generate the SBOM of the software.

14. The system according to claim 8, wherein the at least one processor is further configured to execute the instructions to:

store a bundle comprising the software, the at least one trust broker signature, and the digital certificate in a trust broker registry; and provide the bundle to at least one of an O-RAN operator and an O-Cloud operator corresponding to the O-RAN system for verification of the at least one trust broker signature and deployment in the O-RAN system, the at least one of the O-RAN operator and the O-Cloud operator having the trust relationship with the trust broker.

15. A non-transitory computer-readable recording medium having recorded thereon instructions executable by at least one processor of a trust broker to perform a method for establishing trust of vendor-supplied Open Radio Access Network (O-RAN) software, the method comprising:

receiving a plurality of O-RAN software from a plurality of O-RAN software vendors, the plurality of O-RAN software respectively signed by the plurality of O-RAN software vendors;

for a software, among the plurality of O-RAN software, verifying a signature included with the software using a vendor certificate issued by a certificate authority (CA) of the corresponding vendor;

based on successful verification of the signature, performing a software attestation with respect to the software using a digital certificate issued by a CA of the trust broker; and providing the attested software to an operator corresponding to an O-RAN system and with which the trust broker has a trust relationship, wherein the performing the software attestation comprises:

submitting a certificate signing request (CSR) to the CA of the trust broker, the CSR including a public key of the trust broker;

obtaining the digital certificate issued by the CA of the trust broker, based on the certificate signing request, the digital certificate including the public key of the trust broker; and generating at least one trust broker signature corresponding to the software, using a private key corresponding to the public key of the trust broker, wherein the generating the at least one trust broker signature comprises:

generating a first trust broker signature by generating and encrypting, using the private key, a signature of the software;

generating a second trust broker signature by generating and encrypting, using the private key, a signature of a scan result corresponding to a vulnerability scan of the software; and generating a third trust broker signature by generating and encrypting, using the private key, an SBOM of the software.

* * * * *